United States Patent
Iwamatsu et al.

(10) Patent No.: US 6,323,888 B1
(45) Date of Patent: Nov. 27, 2001

(54) IMAGE FORMING APPARATUS

(75) Inventors: Tadashi Iwamatsu, Nara; Tetsuro Toyoshima, Soraku-gun; Nobuyuki Azuma, Ibaraki; Yoshinori Mutou, Kitakatsuragi-gun; Yoshinori Nakajima, Joyo, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/642,131

(22) Filed: Aug. 18, 2000

(30) Foreign Application Priority Data

Aug. 20, 1999 (JP) ................................................. 11-233625
May 16, 2000 (JP) ................................................. 12-142663

(51) Int. Cl.[7] ............................. B41J 2/385; B41J 2/435; G03G 13/04
(52) U.S. Cl. ............................ 347/131; 347/140; 347/228
(58) Field of Search .................................. 347/140, 131, 347/129, 228

(56) References Cited

U.S. PATENT DOCUMENTS 5,313,233 * 5/1994 Nagase et al. ........................ 347/140

FOREIGN PATENT DOCUMENTS

| 58-152269 | 9/1983 | (JP) . |
| 5-216330 | 8/1993 | (JP) . |
| 9-319264 | 12/1997 | (JP) . |
| 10-171221 | 6/1998 | (JP) . |
| 10-282709 | 10/1998 | (JP) . |

OTHER PUBLICATIONS

"The Effect of Exposuring on Image Reproduction in Laser Beam Printer", N. Kawamura, et al. Journal of Society of Electrophotography of Japan, vol. 26, No. 4, pp. 24–33 (1987). In Japanese with English translations of relevant passages included.

"Ion Printing Techonolgy", Rumsey, et al. Journal of Imaging Technology, vol. 12, No. 3, Jun., 1986.

* cited by examiner

Primary Examiner—Susan S. Y. Lee
(74) Attorney, Agent, or Firm—Dike, Bronstein, Roberts & Cushman; David G. Conlin

(57) ABSTRACT

An image forming apparatus has the following characteristics: the diameter of an exposure beam for exposing a latent image is not more than twice a minimum dot recording period p in peak intensity $1/e^2$, and the value of a spatial frequency characteristic function of a latent image defined by the thickness of a photoreceptor layer, the dielectric constant of the photoreceptor layer, the thickness of a developer layer, the dielectric constant of the developer layer and a spatial frequency $\omega$ defined as $\omega=\pi/p$ is at least 0.3. The image forming apparatus having such characteristics can reproduce an image of high resolution exceeding 600 to 1200 DPI with high fidelity.

11 Claims, 13 Drawing Sheets

| THICKNESS OF PHOTORECEPTOR | l | 20 μm |
|---|---|---|
| DIELECTRIC CONSTANT OF PHOTORECEPTOR | $\varepsilon_a$ | 3 |
| THICKNESS OF TONER LAYER | m | 20 μm |
| DIELECTRIC CONSTANT OF TONER LAYER | $\varepsilon_b$ | 2 |
| POTENTIAL OF DEVELOPING ELECTRODE | $V_0$ | 0 |
| CHARGE POTENTIAL OF PHOTORECEPTOR | $V_{ch}$ | 1000V |
| CHARGE DENSITY ON SURFACE OF PHOTORECEPTOR | $\sigma_0$ | 1.33mC/m² |

FIG.6
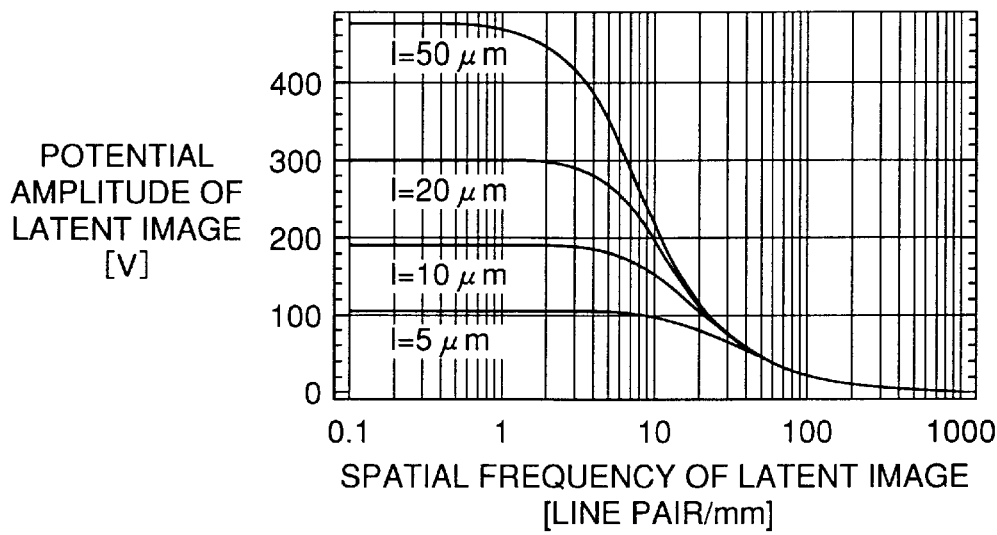
FIG.7
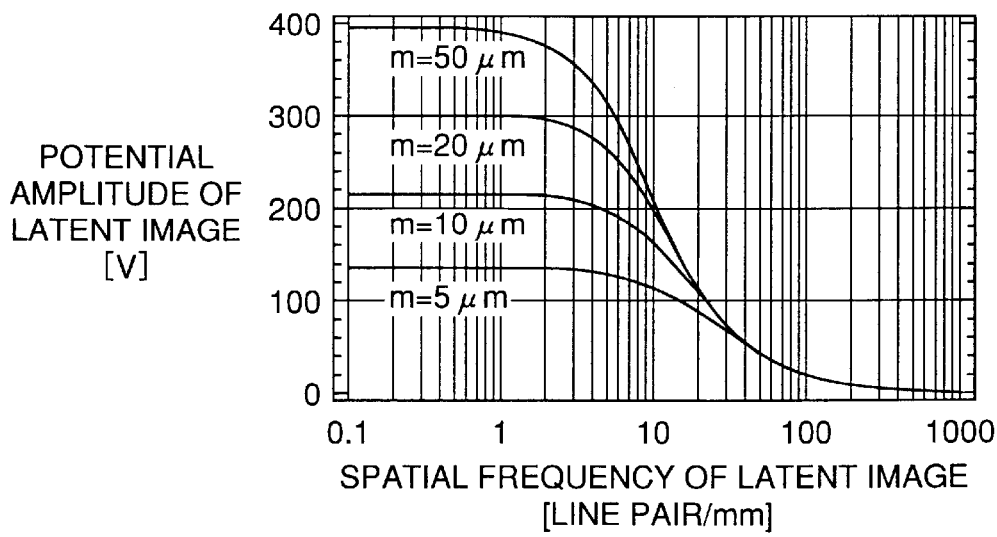
FIG.8
|  | Xw | Xb |
|---|---|---|
| ISOLATED WHITE LINE | p | 5p |
| PERIODIC LINE | p | p |
| ISOLATED BLACK LINE | 5p | p |

| THICKNESS OF PHOTORECEPTOR | l | 20 μm |
|---|---|---|
| DIELECTRIC CONSTANT OF PHOTORECEPTOR | $\varepsilon_a$ | 3 |
| THICKNESS OF TONER LAYER | m | 20 μm |
| DIELECTRIC CONSTANT OF TONER LAYER | $\varepsilon_b$ | 2 |
| DIAMETER OF EXPOSURE BEAM | W | 30 μm |
| MINIMUM DOT RECORDING PERIOD | p | 20 μm (CORRESPONDING TO 1200 DPI) |
| VOLUME MEAN PARTICLE SIZE OF TONER | Dt | 5 μm |
| RESISTANCE OF DEVELOPING ROLLER | Rdev | 1MΩ |

FIG.18

| THICKNESS l [μm] OF PHOTORECEPTOR | DETERMINATION (1) | DETERMINATION (2) |
|---|---|---|
| 6 | ○ | ○ |
| 8.6 | ○ | ○ |
| 10 | ○ | ○ |
| 15 | ○ | × |
| 18 | ○ | × |
| 20 | ○ | × |
| 22 | × | × |
| 26 | × | × |

FIG.19

| DIAMETER W [μm] OF EXPOSURE BEAM | DETERMINATION (3) |
|---|---|
| 20 | ○ |
| 30 | ○ |
| 40 | △ |
| 50 | × |

FIG.20

| VOLUME MEAN PARTICLE SIZE Dt [μm] OF TONER | DETERMINATION (4) |
|---|---|
| 3.2 | ○ |
| 5.0 | ○ |
| 7.5 | × |
| 8.3 | × |
| 10 | × |

| TYPE OF DEVELOPING ROLLER | MEAN RESISTANCE VALUE (MΩ) | DETERMINATION (5) |
|---|---|---|
| CLA | 1.03 | ○ |
| CLB | 0.19 | ○ |
| CLC | 12.3 | × |

IMAGE FORMING APPARATUS

BACKGROUND OF THE INVENTION

1. Field of the Invention

The present invention relates to a digital image forming apparatus forming an electrostatic latent image and visualizing the same with toner, and more particularly, it relates to an image forming apparatus attaining improvement in gradation, resolution and stability.

2. Description of the Prior Art

In relation to a copying machine or a printer of an electrophotographic system, resolution of a digital printing technique is improved in order to satisfy requirement for high image quality. While the mainstream resolution has generally been 400 to 600 DPI (dots per inch), an image forming apparatus having resolution of at least 1200 DPI is now being put into practice. In order to implement such high resolution, the technical level must be improved in each process of the electrophotographic system. It is argued that reduction of an exposure beam diameter, reduction of the particle size of toner, reduction of the thickness of a photoreceptor and the like are qualitatively effective for such improvement.

Japanese Patent Laying-Open No. 58-152269 (1983) discloses exemplary numerical limitation of $1.8 \text{ p} \leq W \leq 1.9 \text{ p}$ as to the relation between a minimum dot recording period p (inverse number of resolution) and an exposure beam diameter W. More specifically, Journal of Society of Electrophotography of Japan Vol. 26, No. 4, pp. 24 to 33 (1987) argues the optimum spot diameter of an exposure beam and discloses exemplary numerical limitation of $1.3 \text{ p} < W < 1.6 \text{ p}$ while the value varies with laser power. The minimum dot recording period p indicates the minimum period of dots forming an image. For example, the minimum dot recording period p of a printer having resolution of 600 DPI is $25.4/600 = 0.0423$ mm.

Japanese Patent Laying-Open No. 9-319164 (1997) discloses that deterioration of a latent image can be suppressed without employing a thin-film photoreceptor by limiting the relation between an exposure beam diameter, the thickness of a photoreceptor and a contrast potential of a latent image. Further, Japanese Patent Laying-Open No. 10-282709 (1998) discloses that deterioration of a latent image as well as deterioration of transfer can be suppressed by limiting the relation between the thickness of a photoreceptor, a transfer current and the area of an exposure beam. Similarly, Japanese Patent Laying-Open No. 5-216330 (1993) limits a film thickness, a beam diameter, the particle size of toner and the diameter of a carrier, while Japanese Patent Laying-Open No. 10-171221 (1998) limits a film thickness, a beam diameter, exposure energy and sensitivity of a photoreceptor. In addition, "Ion Printing Technology" in Journal of Imaging Technology, Vol. 12, 144 (1986) discloses a technique of directly supplying ions onto an insulator for forming an electrostatic latent image dissimilarly to that employing the aforementioned photoreceptor or an exposure device, and implements image formation with resolution of 300 DPI.

As described above, the resolution has recently been improved from 600 DPI to 1200 DPI, in order to satisfy the requirement for high image quality in a copying machine or a printer. Under the present circumstances, however, true resolution is not yet improved due to various practical problems.

For example, a conventional apparatus setting only resolution to 1200 DPI with an exposure beam of about 70 to 80 $\mu$m in diameter for 600 DPI cannot implement an isolated dot or an isolated line of 1200 DPI. This is because the contrast of a latent image potential is so reduced that field strength necessary for development cannot be formed when the resolution of the latent image is improved. The isolated dot is an image pattern of a single black or white dot on a white or black background. The isolated line is an image pattern of a single black or white line on a white or black background. White indicates a recording medium part (paper or the like) recording no image, and black indicates a part (color part) recording an image.

In order to improve resolution with a photoreceptor having a general thickness, a method of reducing the diameter of an exposure beam and increasing a contrast potential may be applied as shown in Japanese Patent Laying-Open No. 9-319164. The contrast potential defined herein is the difference between an initial charge potential of a photoreceptor and a charge potential in full exposure. In view of frequency characteristics of a latent image, the contrast potential indicates the contrast of a latent image potential with respect to a DC latent image. The contrast of the latent image potential is reduced as the spatial frequency (hereinafter referred to as a latent image spatial frequency) of the latent image is increased. In a high-frequency latent image formed with resolution of at least 600 DPI, particularly with resolution of at least 1200 DPI, the contrast of the latent image potential is remarkably reduced to result in various types of image quality deterioration. The latent image spatial frequency is expressed in line pairs/mm as the number of pairs of white and black lines having the same line width existing in an area of 1 mm.

While a latent image can be beautifully formed when simply reducing the thickness of a photoreceptor or the diameter of an exposure beam, it is extremely difficult to develop the latent image. This is because the latent image frequency is increased regardless of the beauty/fidelity of the latent image and hence its potential amplitude is so reduced that field strength necessary for development cannot be formed. Further, reduction of the thickness of the photoreceptor must be kept at the minimum necessary level so that the life of the photoreceptor is not reduced due to abrasion.

In addition, compatibility of a periodic line pattern ($\lambda = 2$ p) of a minimum on/off recording period $\lambda [\mu m]$, an isolated online pattern and an isolated offline pattern is disadvantageously deteriorated following improvement of the resolution. The periodic line pattern of the minimum on/off recording period is an image pattern periodically forming presence/absence of dots in the minimum dot recording period p. The isolated online pattern is an image pattern forming a black line (ine of a color other than black in the case of a color printer) on a white background. The isolated offline pattern is an image pattern forming a white line on a black background (background of a color other than black in the case of a color printer).

SUMMARY OF THE INVENTION

An object of the present invention is to provide an image forming apparatus reproducing an image pattern of high resolution with high fidelity.

In order to attain the aforementioned object, an image forming apparatus according to an aspect of the present invention comprises an exposure part exposing a photoreceptor layer previously prepared with a minimum dot recording period and forming an electrostatic latent image and a developing part developing the formed electrostatic latent image with a developer layer, and has the following characteristics: The diameter of an exposure beam employed for exposure in the exposure part is less than or equal to twice the minimum dot recording period in peak intensity $1/e^2$, and a spatial frequency characteristic function corresponding to the electrostatic latent image defined in association with at least the thickness of the photoreceptor layer, the dielectric constant of the photoreceptor layer, the thickness of the developer layer and the dielectric constant of the developer layer has a prescribed range. This prescribed range is a range for compatibility of the density of an image area and the density of a non-image area in each of a plurality of types of different image patterns.

In the aforementioned image forming apparatus, a spatial frequency characteristic function MTF(modulation transfer function)$_{lmt}$ of the electrostatic latent image, expressed in the following equation (1), is greater than or equal to 0.3 assuming that p represents the minimum dot recording period, l represents the thickness of the photoreceptor layer, $\epsilon_a$ represents the dielectric constant of the photoreceptor layer, m represents the thickness of the developer layer, $\epsilon_b$ represents the dielectric constant of the developer layer and ω represents a spatial frequency defined as ω=π/p:

$$MTF_{lmt} = \frac{\left(\frac{1}{\epsilon_a}\right)^{-1} + \left(\frac{m}{\epsilon_b}\right)^{-1}}{\left(\frac{\tanh(\omega l)}{\epsilon_a \omega}\right)^{-1} + \left(\frac{\tanh(\omega m)}{\epsilon_b \omega}\right)^{-1}} \quad (1)$$

According to the aforementioned image forming apparatus, crosstalk from/to an adjacent exposure beam is reduced by setting various types of parameters related to image formation so that the value of the spatial frequency characteristic function MTF$_{lmt}$ is in a prescribed range of at least 0.3, for example, so that a high-definition electrostatic latent image can be formed with small MTF deterioration, reduction of the latent image potential contrast can be prevented on the developing part and frequency characteristics of development can be improved. Therefore, an image pattern can be reproduced in high resolution by improving compatibility between a periodic line and an isolated line. The isolated line is an image pattern forming a single black or white thin line on a white or black background. The periodic line is an image pattern formed by alternately repeating white and black thin lines.

The aforementioned image forming apparatus is characterized in that the spatial frequency characteristic function MTF$_{lmt}$ is greater than or equal to 0.48. According to this characteristic, compatibility of a periodic line and an isolated dot is so improved that an image can be output with higher definition.

The aforementioned image forming apparatus is characterized in that the mean particle size $D_t$ of the developer per unit volume is less than or equal to p/4. Thus, driving force for development can effectively act on the developer also in an electric field of a high-resolution electrostatic latent image having a minimum recording period p of not more than 43 μm, so that excellent image quality can be attained.

In the aforementioned image forming apparatus, a nonmagnetic monocomponent contact development method is employed for the development. Thus, a developing electrode can be set in the vicinity of the photoreceptor layer, for improving resolution. In other words, the thickness m of the developing layer can be so reduced that the spatial frequency characteristic function MTF$_{lmt}$ can be increased, whereby the frequency characteristics of a developing field are consequently improved for obtaining a high-resolution image.

In the aforementioned image forming apparatus, the developing part has a developer carrier for carrying the developing layer and sticking the same to the electrostatic latent image. The resistance of this developer carrier in a developing area is not more than $10^6$ Ω. Thus, the developer carrier can be substantially treated as a conductor, i.e., the surface of the developer carrier can be regarded as a developing electrode, whereby the thickness m of the developing layer can be reduced for attaining an effect similar to the above.

An image forming apparatus according to another aspect of the present invention comprises an electrostatic latent image forming part forming an electrostatic latent image of a minimum dot recording period on a previously prepared dielectric layer and a developing part developing the formed electrostatic latent image with a developer layer, and has the following characteristics: The minimum dot recording period is not more than 43 μm, and a spatial frequency characteristic function corresponding to the electrostatic latent image defined in association with at least the thickness of the dielectric layer, the dielectric constant of the dielectric layer, the thickness of the developer layer and the dielectric constant of the developer layer has a prescribed range. The prescribed range is a range for compatibility of the density of an image area and the density of a non-image area in each of a plurality of types of different image patterns.

In the aforementioned image forming apparatus, a spatial frequency characteristic function MTF$_{lmt}$ of the electrostatic latent image, expressed in the following equation (2), is greater than or equal to 0.3 assuming that p represents the minimum dot recording period, l represents the thickness of the dielectric layer, $\epsilon_a$ represents the dielectric constant of the dielectric layer, m represents the thickness of the developer layer, $\epsilon_b$ represents the dielectric constant of the developer layer and ω represents a spatial frequency defined as ω=π/p:

$$MTF_{lmt} = \frac{\left(\frac{1}{\epsilon_a}\right)^{-1} + \left(\frac{m}{\epsilon_b}\right)^{-1}}{\left(\frac{\tanh(\omega l)}{\epsilon_a \omega}\right)^{-1} + \left(\frac{\tanh(\omega m)}{\epsilon_b \omega}\right)^{-1}} \quad (2)$$

In the aforementioned image forming apparatus, the electrostatic latent image forming part has a charge supply part. The charge supply part is driven to supply ions or electrons onto the dielectric layer for forming the electrostatic latent image on the dielectric layer. Thus, an electrostatic latent image carrier can be prepared not from a photoreceptor but from a general insulator, whereby the image forming apparatus also attains the following effects in addition to those in the aforementioned image forming apparatus having the photoreceptor layer: The degree of freedom in material selection is increased as to the latent image carrier, the dielectric constant $\epsilon_a$ of the dielectric layer can be further increased, and the aforementioned spatial frequency characteristic function MTF$_{lmt}$ can be improved.

The aforementioned image forming apparatus is characterized in that the spatial frequency characteristic function MTF$_{lmt}$ is greater than or equal to 0.48. According to this characteristic, compatibility of a periodic line and an isolated dot is so improved that an image can be output with higher definition.

In the aforementioned image forming apparatus, a nonmagnetic monocomponent contact development method is employed for the development. Thus, a developing electrode can be set in the vicinity of the photoreceptor layer, for improving resolution. In other words, the thickness m of the developing layer can be so reduced that the spatial frequency characteristic function $MTF_{ltnt}$ can be increased, whereby the frequency characteristics of a developing field are consequently improved for obtaining a high-resolution image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a graph showing results of calculation of the relation between a latent image wavelength and a latent image potential amplitude according to the embodiment of the present invention;

FIG. 7 is a graph showing results of calculation of the relation between the latent image wavelength and the latent image potential amplitude with a parameter of the thickness of a toner layer according to the embodiment of the present invention;

FIG. 8 illustrates conditions related to compatibility analysis of isolated and periodic lines according to the embodiment of the present invention in the form of a table;

FIG. 18 illustrates the results of evaluation of compatibility of isolated and periodic lines related to the thickness of a photoreceptor film according to the, embodiment of the present invention in the form of a table;

FIG. 19 illustrates the results of evaluation of compatibility of isolated and periodic lines related to the diameter of an exposure beam according to the embodiment of the present invention in the form of a table;

FIG. 20 illustrates the results of evaluation of compatibility of isolated and periodic lines related to the volume mean particle size of toner according to the embodiment of the present invention in the form of a table;

DESCRIPTION OF THE PREFERRED EMBODIMENTS

An embodiment of the present invention is now described with reference to the drawings.

Figure 1:
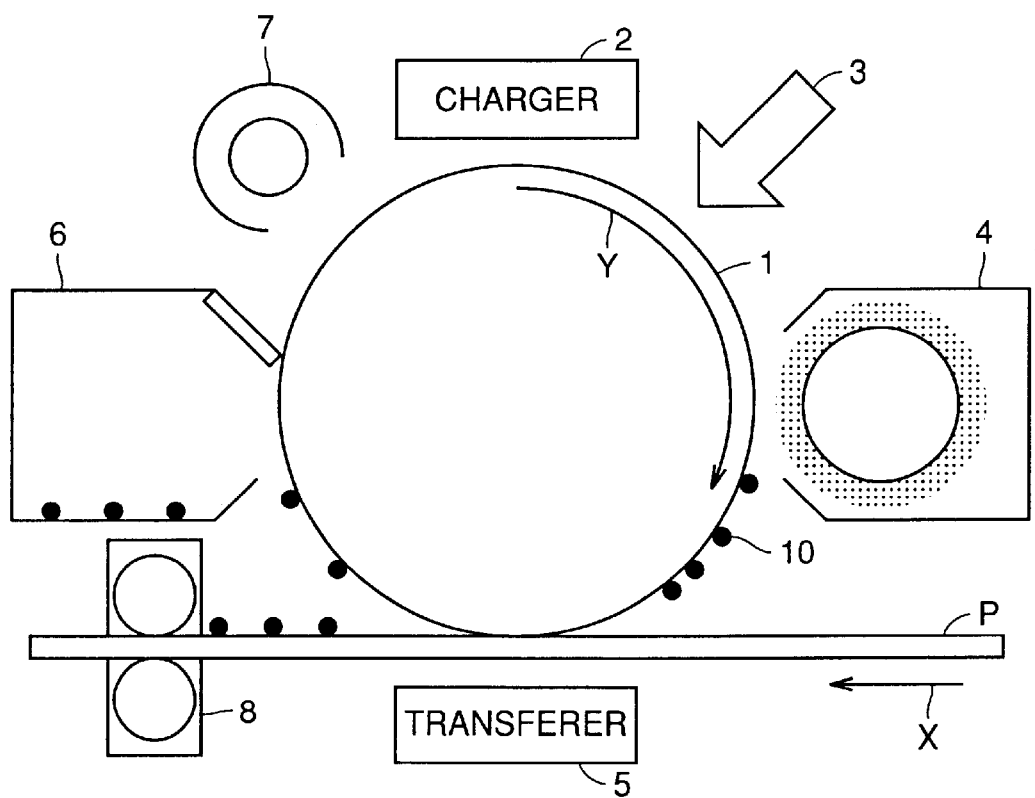
FIG. 1 is a schematic block diagram of an image forming apparatus according to an embodiment of the present invention.

First, the structure of an image forming apparatus according to this embodiment is schematically described with reference to FIG. 1. As shown in FIG. 1, the image forming apparatus includes a photoreceptor 1 arranged on a substantially central portion thereof, a charger 2 for uniformly charging the surface of the photoreceptor 1, an optical system (not shown) applying an image formed by light 3 responsive to the image onto the surface of the photoreceptor 1, a developing device 4 for developing and visualizing an electrostatic latent image formed on the surface of the photoreceptor 1 due to exposure by the optical system, a transferer 5 transferring the developed image (image of toner 10) onto a sheet paper P properly fed along arrow X, a cleaning device 6 removing part of a developer (the toner 10) not subjected to transfer but remaining on the photoreceptor 1 after the transfer, a discharger 7 removing charges remaining on the surface of the photoreceptor 1 and a fixing device 8. The elements from the charger 2 to the discharger 7 are arranged in this order along arrow Y. the direction of rotation of the photoreceptor 1, to be opposed to the periphery of the photoreceptor 1. The photoreceptor 1 is in the form of a drum rotated/driven along arrow Y at a constant speed in image formation so that the electrostatic latent image is formed on its surface.

The photoreceptor 1, generally having a function-separated structure formed by a charge generation layer (CGL) and a charge transport layer (CTL) stacked on a conductive base material, may perform charge generation and charge transportation on the same layer.

The conductive base material is prepared from a base material having conductivity itself, such as aluminum, an aluminum alloy, copper, zinc, stainless steel, chromium, titanium, nickel or magnesium, for example. Alternatively, the conductive base material may be formed by a dielectric base material of plastic or the like covered with a film serving as a conductive layer prepared by depositing aluminum, indium oxide or a tin oxide alloy. Further alternatively, the conductive base material may be prepared from plastic or paper mixed with conductive particles.

An undercoat layer (UCL) having a function of preventing charge injection and an adhesive function may be provided between a conductive support and the charge generation layer. The undercoat layer is prepared from casein, polyvinyl alcohol, polyamide, nitrocellulose, polyvinyl butyral, polyurethane, an ethylene-acrylic acid copolymer or the like. The thickness of the undercoat layer is not more than 5 μm, preferably in the range of 0.1 to 3 μm.

The charge generation layer is prepared from a phthalocyanine pigment, an azo pigment, a bisazo pigment, a quinone pigment, a perylene pigment, a quinacridone pigment or an indigo pigment, and the thickness of this layer is 0.01 to 10 μm, preferably in the range of 0.05 to 5 μm.

The charge transport layer is prepared from a hydrazone compound, a stilbene compound, a benzidine compound, a pyrazoline compound, an oxazole compound, a thiazole compound, a triarylmethane compound, a carbazole compound or the like, and the thickness of this layer is 3 to 60 μm, preferably in the range of 5 to 40 μm.

Binder resin is employed along with the aforementioned charge generation material and the charge transport material. Examples of the binder resin are polycarbonate, styrene, polyester, vinyl acetate, acrylate, vinyl chloride, methacrylate, polyurethane, trifluoroethylene, vinylidene fluoride, polyvinyl alcohol, polyvinyl acetal, polysulfone, polyphenylene oxide, cellulose resin, phenolic resin, epoxy resin, melamine resin and silicone resin.

A large quantity of papers P are stored in a tray (not shown) or a cassette (not shown), for example. The stored papers P are fed one by one by a feeder (not shown) to a transfer area, opposed to the photoreceptor 1, on which the aforementioned transferer 5 is arranged to align with the forward end of the image formed by the toner 10 on the surface of the photoreceptor 1 so that the image is transferred onto each paper P. After this transfer, the paper P is separated from the photoreceptor 1 and fed to the fixing device 8.

The fixing device 8, including a heat roller and a pressure roller, fixes the unfixed image of the toner 10 transferred onto the paper P as a permanent image. A surface of the heat roller opposed to the image of the toner 10 transferred onto the paper P is heated to a temperature for melting the toner 10 and fixing the image thereof onto the paper P. The pressure roller, opposed to the heat roller, brings the paper P into close contact with the heat roller.

The paper P passing through the fixing device 8 is discharged from the image forming apparatus onto a discharge tray (not shown) through a discharge roller (not shown).

The image forming apparatus is a printer or a digital copying machine, and hence the optical system applies the image formed by the light 3 obtained by ON-OFF controlling a semiconductor laser in response to image data onto the surface of the photoreceptor 1. In particular, the digital copying machine inputs digital image data obtained by reading reflected light from an original to be copied by an image read sensor such as a CCD (charge-coupled device) in the optical system including the semiconductor laser for outputting the image formed by the light 3 responsive to the image data onto the surface of the photoreceptor 1. On the other hand, the printer converts digital image data supplied from another processor such as a word processor or a personal computer, for example, to the image formed by the light 3 and applies this image onto the surface of the photoreceptor 1. The image data may be converted to the image formed by the light 3 not by the semiconductor laser but by an LED (light-emitting diode) or a liquid crystal shutter.

When starting image formation, the image forming apparatus having the aforementioned structure rotates/drives the photoreceptor 1 along arrow Y, and the charger 2 charges the surface of the photoreceptor 1 to a potential of specific polarity. After this charging, the optical system (not shown) applies the image formed by the light 3 onto the surface of the photoreceptor 1, for forming the electrostatic latent image responsive to the image formed by the light 3 on the surface of the photoreceptor 1. The developing device 4 develops and visualizes this electrostatic latent image. In this development, the monocomponent toner 10 is selectively attracted to the electrostatic latent image formed on the surface of the photoreceptor 1 by electrostatic force, for example.

The transferer 5 arranged on the transfer area transfers the image of the toner 10 formed on the surface of the photoreceptor 1 due to the aforementioned development onto the surface of the paper P properly fed in synchronization with the rotation of the photoreceptor 1. The transferer 5 charges the rear surface of the paper P with polarity reverse to the charge polarity of the toner 10, thereby making transition of the image of the toner 10 to the paper P.

After the transfer, part of the image of the toner 10 not subjected to transfer remains on the surface of the photoreceptor 1. The cleaning device 6 removes the remaining part of the toner 10 from the surface of the photoreceptor 1. Thereafter the discharger 7 sets the potential of the surface of the photoreceptor 1 to a uniform level of substantially zero, for example, in order to reuse the photoreceptor 1.

The paper P subjected to transfer is separated from the surface of the photoreceptor 1 and fed to the fixing device 8. The fixing device 8 melts the image of the toner 10 transferred onto the paper P and presses the same against the paper P due to the pressure between the aforementioned heat roller and the pressure roller. The paper P passing through the fixing device 8 is discharged to the discharge tray (not shown) or the like provided outside the image forming apparatus.

Figure 2:
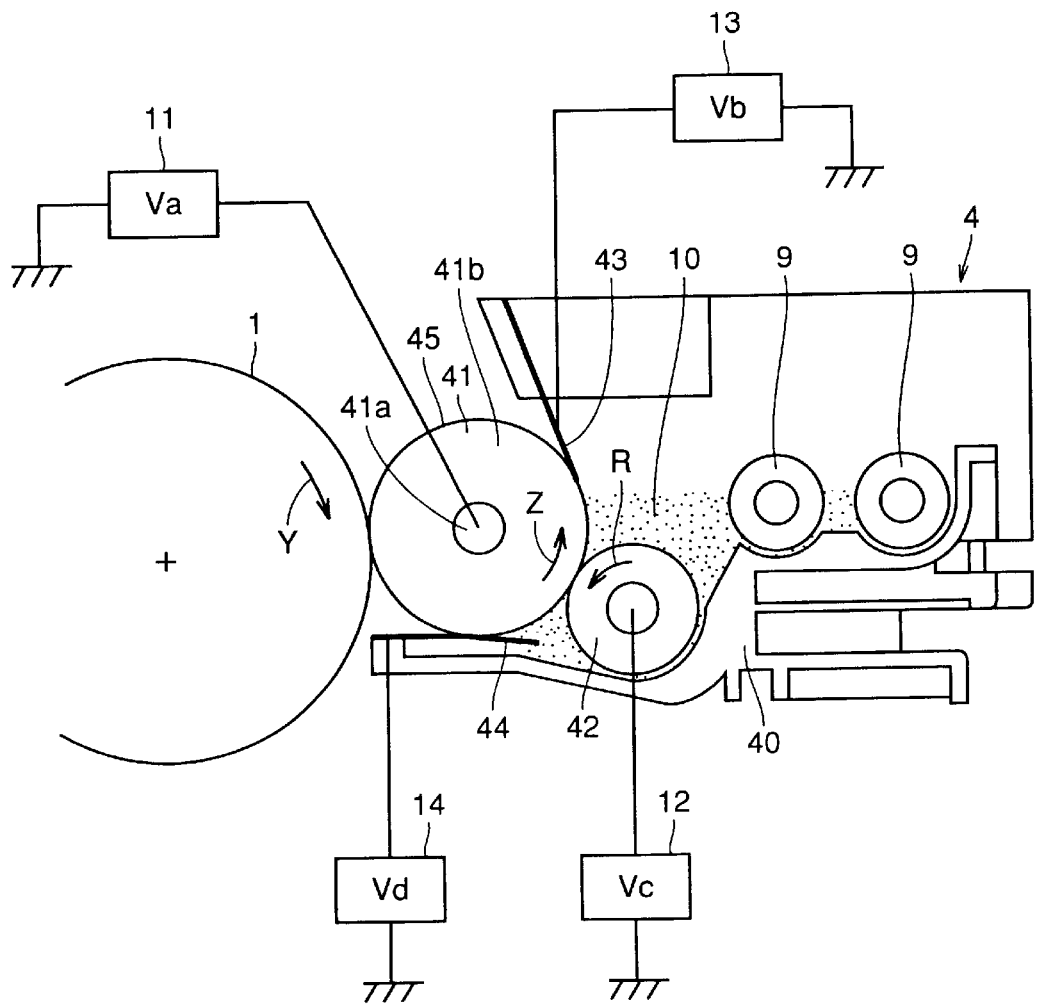
FIG. 2 is a schematic block diagram of a developing device employed in the image forming apparatus according to the embodiment of the present invention.

The developing device 4 employing a contact phenomenon with the nonmagnetic monocomponent toner 10 is now described with reference to FIG. 2. The developing device 4 includes a developer tank 40 storing the monocomponent toner 10 such as nonmagnetic monocomponent toner, for example, a developing roller 41 and a supply roller 42 rotatably provided in the developer tank 40, an agitator or screw roller 9, a blade 43, a reset member 44 and bias power supply circuits 11 to 14. The supply roller 42 supplies the toner 10 to the developing roller 41. The agitator or screw roller 9 feeds the toner 10 supplied at need into the developer tank 40. The toner 10, having a mean particle size of about 7 μm, for example, is prepared from polyester toner or styrene acrylic toner.

The developing roller 41 is partially exposed from the developer tank 40 to be opposed to the surface of the photoreceptor 1 for transporting the toner 10 to the developing area, coupled with a driving motor (not shown) and driven to rotate in the same direction (along arrow Z) as the photoreceptor 1. The aforementioned supply roller 42 is in pressure contact with the developing roller 41.

The toner 10 attracted to the surface of the developing roller 41 is transported to the developing area opposed to the surface of the photoreceptor 1. The area of the developing roller 41 in pressure contact with the surface of the photoreceptor 1 serves as the developing area for attracting the toner 10 to the electrostatic latent image formed on the surface of the photoreceptor 1 and developing the electrostatic latent image. Condition setting on the developing area where the developing roller 41 comes into contact with the photoreceptor 1 is an important part of the present invention, as described later in detail.

The bias power supply circuit 11 supplies a bias voltage Va for development to the developing roller 41. The bias voltage Va is set to polarity and a value for sticking the toner 10 to the electrostatic latent image formed on the surface of the photoreceptor 1 while not sticking the toner 10 to the remaining area, i.e., a non-image area.

The developing roller 41 is formed by coating the surface of a metal roller (including a rotary shaft) with a high polymer elastic body, for example. When preparing the high polymer elastic body by dispersing carbon in polyurethane or the like or employing ion-conductive solid rubber or the like, the developing roller 41 can keep a prescribed resistance value not fusing the toner 10, for effectively acting when supplied with a developing bias voltage as described later.

More specifically, the developing roller 41 is formed by covering a mandrel (shaft 41a) of a metal or low-resistance resin with a semi-conductive layer 41b of an elastic member having a dielectric constant of about 10, for example. A toner layer 45 is formed on the surface of the semi-conductive layer 41b.

The elastic member covering the surface of the developing roller 41 is properly based on dispersed resistance regulating resin dispersively synthesized from resin selected from EPDM (ethylene-propylene-diene copolymer), urethane, silicon, nitrile butadiene rubber, chloroprene rubber, styrene butadiene rubber and butadiene rubber with conductive particles of one or both of carbon and $TiO_2$ (titanium oxide) or based on electric resistance regulating resin employing one or some of ionic conductive materials such as inorganic ionic conductive substances such as sodium perchlorate, calcium perchlorate and sodium chloride, for example, for the aforementioned resin. When employing a foaming agent for foaming in a foaming/mixing step for improving elasticity, a silicon surface active agent of polydialsiloxane, polysiloxane or a polyalkylenoxide block copolymer is properly employed.

The aforementioned foaming may be performed by hot blow foaming, for example. In the hot blow foaming, proper quantities of the aforementioned materials are mixed with each other, stirred in a mixing syringe, injected into an injection extrusion mold, heated to 80 to 120° C. and injected. The heating time is preferably about 5 to 100 minutes.

When integrally molding the aforementioned elastic member and the mandrel (the shaft 41a) with each other by injection molding, the conductive metal mandrel (the shaft 41a) is arranged at the center of a previously prepared mold for introducing mixed materials into the mold similarly to the above and heating/vulcanizing the same for about 10 to 160 minutes.

One of electric resistance regulating materials for the developing roller 41 is prepared from carbon black having a nitrogen adsorption specific surface area of at least 20 $m^2/g$ and not more than 130 $m^2/g$ and oil adsorption of at least 60 ml/g and not more than 120 ml/g, which is mixed by 0.5 to 15 parts by weight (or about 70 parts by weight as the case may be) with respect to 100 parts by weight of polyurethane.

The aforementioned polyurethane is properly prepared from soft polyurethane foam or polyurethane elastomer. Alternatively, the aforementioned EPDM, urethane, silicon, nitrile butadiene rubber, chloroprene rubber or butadiene rubber may be employed.

The developing roller 41 may be mainly composed of EPDM, in place of polyurethane. EPDM, prepared by properly blending ethylene, propylene and a third component such as dicyclopentadiene, ethylidene norbornene or 1,4-hexadiene, for example, preferably contains 5 to 95 parts by weight of ethylene, 5 to 95 parts by weight of propylene and 0 to 50 parts by weight of the third component in an iodine value. When carbon black is blended by 1 to 30 parts by weight with respect to 100 parts by weight of EPDM, excellent dispersibility is attained.

When employing an ion conductive substance such as sodium perchlorate or tetraethyl ammonium chloride or a surface active agent such as dimethylpolysiloxane or polyoxyethylene laurylether by 0.1 to 10 parts by weight with respect to 100 parts by weight of EPDM as a resistance regulating base material along with carbon black serving as the resistance regulating material, more excellent dispersion homogeneity is attained.

The aforementioned ion conductive substance can be prepared from an ionic conductive material such as an inorganic ionic conductive substance such as sodium perchlorate, calcium perchlorate or sodium chloride or an organic ionic conductive substance such as denatured aliphatic dimethylethyl ammonium ethosulfate, stearylammonium acetate, lauryl ammonium acetate, octadecyl trimethyl ammonium perchlorate or the like. One or some of these can be employed.

The supply roller 42 is rotated along arrow R oppositely to the direction of rotation of the developing roller 41 on the portion (pressure contact area) opposed to the developing roller 41. The electrical resistance of the supply roller 42, prepared from a material similar to that of the developing roller 41, can be regulated by a resistance regulating material similar to that for the developing roller 41. The supply roller 42 is prepared from a foaming (porous) material, in order to further increase its elasticity.

The bias power supply circuit 12 applies a bias voltage Vc to the supply roller 42. The bias voltage Vc is generally set in a direction for pressing the toner 10 against the developing roller 41 for rendering the toner 10 repel the supply roller 42 and supplying the same to the developing roller 41. When the toner 10 is of negative polarity, for example, the bias voltage Vc applied to the supply roller 42 is set to a level higher than the toner 10 toward the negative polarity side.

The developing roller 41 and the supply roller 42 are coupled with driving motors (not shown) and rotated along arrows Z and R respectively, so that the toner 10 is supplied from the supply roller 42 to the developing roller 41 and an undeveloped part thereof is separated (removed) from the surface of the developing roller 41 after development.

The toner 10 supplied by the supply roller 42 is stuck on the surface of the developing roller 41 and transported to the developing area opposed to the surface of the photoreceptor 1. In advance of this transportation, the blade 43 regulates the quantity of adhesion of the toner 10 properly coming into pressure contact with the developing roller 41 on the surface of the developing roller 41 to a constant toner layer thickness.

The blade 43 is brought into pressure contact with the developing roller 41 with proper pressure. The blade 43 is formed by a plate-type metal material, and a portion of the flat (surface) in the vicinity of its forward end is brought into pressure contact with the developing roller 41. Therefore, the toner 10 supplied to the developing roller 41 is regulated to a layer having a prescribed charge quantity and a thickness due to prescribed pressing force and position of the blade 43, and transported to the developing area oppositely in contact with the surface of the photoreceptor 1.

The blade 43 is so provided that an end thereof is fixed to the side of the developer tank 40 and the portion of the flat of the other free end is in pressure contact with the surface of the developing roller 41. The blade 43 is formed by a metal plate of phosphor bronze, stainless steel (SUS: special use stainless steel) or the like having a thickness of about 0.1 to 0.2 mm, for example, and the flat portion close to its forward end is brought into pressure contact with the developing roller 41 with prescribed pressure along the longitudinal direction (the direction of the rotary shaft of) the developing roller 41. Thus, the blade 43 regulates the toner 10 carried on the surface of the developing roller 41 through the supply roller 42 to a constant quantity, and the toner 10 is transported to the developing area for coming into contact with the photoreceptor 1. The bias power supply circuit 13 supplies a prescribed bias voltage Vb to the blade 43. When the toner 10 is of negative polarity, for example, the bias voltage Vb for pressing the toner 10 toward the developing roller 41 is set to a higher level toward the negative polarity side. The bias voltage Vb supplied to the blade 43 may be set to the same level as the developing bias voltage Va supplied to the developing roller 41 or a higher level in absolute value.

The toner 10 transported to the developing area opposed to the surface of the photoreceptor 1 selectively adheres to the surface of the photoreceptor 1 in response to the electrostatic latent image formed thereon, for visualizing the electrostatic latent image due to the color of the toner 10. The undeveloped part of the toner 10 is returned into the developing tank 40 through the rotation of the developing roller 41. The reset member 44 is provided on the returning position to be in pressure contact with the developing roller 41. The reset member 44 is arranged in front of the supply roller 42 rotated with respect to the developing roller 41. An end of the reset member 44 is fixed to the developer tank 40 so that the reset member 4 is properly in pressure contact with the surface of the developing roller 41 through its spring property while the flat (surface) of the other free end thereof has an area coming into pressure contact with the surface of the developing roller 41.

After the development, the undeveloped part of the toner 10 is discharged by the reset member 44 and removed from the surface of the developing roller 41 when recovered into the developer tank 40 following rotation of the developing roller 41, to be reused. The power supply circuit 14 supplies a bias voltage Vd for discharging the undeveloped part of the toner 10 and removing the same from the surface of the developing roller 41 to the reset member 44.

The developing device 4 transports the toner 10 to the area opposed to the photoreceptor 1 and visualizes the latent image formed on the surface of the photoreceptor 1 in the aforementioned manner. The transferer 5 transfers the image of the toner 10 formed on the surface of the photoreceptor 1 onto the properly transported paper P in the transfer area, as described above. Thereafter the paper P passes through the fixing device 8 and is discharged from the image forming apparatus.

The toner 10, which is a nonmagnetic monocomponent developer, can be obtained as follows: Materials composed of 80 to 90 parts by weight of a styrene-acrylic copolymer, 5 to 10 parts by weight of carbon black and 0 to 5 parts by weight of a charge controller are mixed with each other, kneaded, pulverized and classified for obtaining negatively charged toner having a mean particle size of about 5 to 10 μm. In order to improve flowability of the toner, silica ($SiO_2$) is mixed into the particles of the toner by 0.5 to 1.5 parts by weight. Alternatively, the surfaces of the particles of the toner are covered with 0.5 to 1.5 parts by weight of silica ($SiO_2$). Consequently, the nonmagnetic monocomponent toner 10 can be obtained.

The toner 10 may not be negatively charged but may be positively charged. The positively charged toner 10 can be readily obtained by properly selecting binding resin serving as the main component, the charge controller or the like. Further, the toner 10 is not restricted to black toner for a monochromatic copying machine or printer but is also applicable to color toner for a color copying machine or printer.

The materials for the nonmagnetic monocomponent toner 10 is not restricted to the above but the following compositions are also applicable to the image forming apparatus according to the present invention:

Thermoplastic binding resin serving as the main component may be prepared from polystyrene, polyethylene, polyester, low molecular weight polypropylene, epoxy, polyamide or polyvinyl butyral, in place of the styrene-acrylic copolymer.

In the case of black toner, a coloring agent may be prepared from furnace black, a nigrosine dye, a metallized dye or the like in place of the aforementioned carbon black. In the case of color toner, a benzidine yellow pigment, phonon yellow, an acetoacetic acid anilide insoluble azo pigment, a monoazo pigment or azomethine dye for yellow, a xanthene magenta dye, a phosphotungstic molybdic acid lake pigment, an anthraquinone dye, a color material consisting of a xanthene dye and organic carboxylic acid, thione indigo or a naphthol insoluble azo pigment for magenta, and a copper phthalocyanine pigment for cyan.

The material covering the particles of the toner as a fluidizer may be prepared from colloidal silica, titanium oxide, alumina, zinc stearate, vinylidene polyfluoride or a mixture thereof, in place of the aforementioned silica.

The charge controller for the toner may be prepared from an azo metallized dye, organic acid metallic complex salt, chlorinated paraffin or the like when the toner is negatively charged. When the toner is positively charged, a nigrosine dye, fatty acid metallic salt, amine, quaternary ammonium salt or the like may be employed as the charge controller.

On the basis of the above description of the image forming apparatus, the part characterizing the present invention is now described.

When performing digital recording in the electrophotographic system, an image is formed on the surface of the photoreceptor 1 by the light 3 through a scan optical system or an LED. Light intensity distribution I(x,y) of this image forming beam is generally expressed in Gauss distribution of the following equation (3):

$$I(x, y) = \frac{2P}{\pi W_x \cdot W_y} \epsilon^{-\frac{2x^2}{W_x^2} - \frac{2y^2}{W_y^2}} [W/m^2] \quad (3)$$

where P represents laser power, and $W_x$ and $W_y$ represent radii when the light intensity I of a spot diameter is $1/e^2$ of the center of the diameter in directions x and y respectively.

Assuming that the light intensity in the direction y is uniform when considering an isolated line latent image in a minimum recording dot width of the same length as the minimum dot recording period p, light intensity distribution $I_{line}(x)$ is expressed in the following equation (4):

$$I_{line}(x) = \frac{\sqrt{2}\,P}{\sqrt{2}\,W_x} \epsilon^{-\frac{2x^2}{W_x^2}} \quad (4)$$

Figure 3:
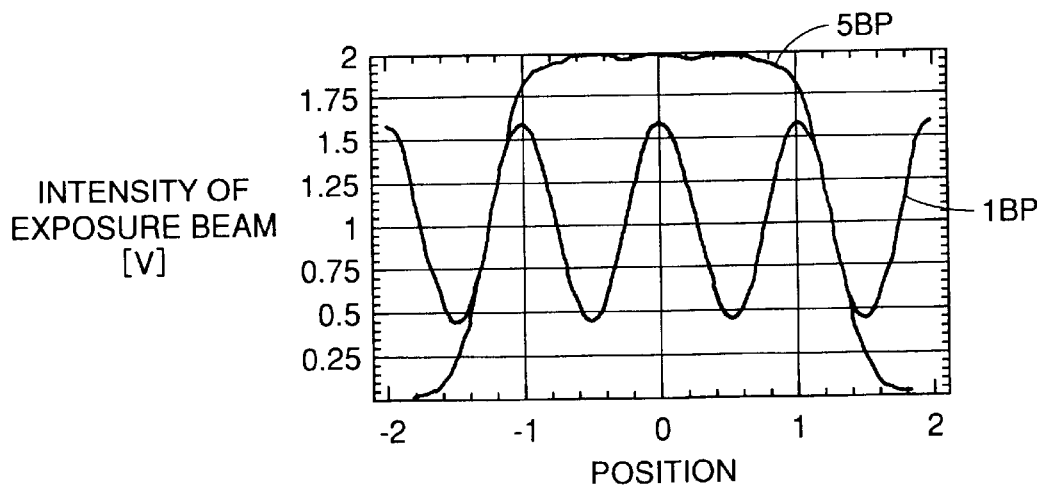
FIG. 3 is a graph for illustrating compatibility in the image forming apparatus according to the embodiment of the present invention.

With the above equation (4), profile calculation of exposure beam intensity has been performed with a parameter of the ratio of the minimum dot recording period p to the exposure beam diameter W. This calculation has been made on a 1-by-1 latent image pattern repeating a line latent image in the minimum recording dot width in an on/off manner and a 5-by-5 pattern repeating a line latent image in a 5-line period in an on/off manner. FIG. 3 shows exemplary results of the calculation. Referring to FIG. 3, a sinusoidal solid line 1BP shows the result of calculation corresponding to the 1-by-1 pattern, and a solid line 5BP shows the result of calculation corresponding to the 5-by-5 pattern. The parameter condition in this case is W=2 p.

A spatial frequency characteristic function MTF defined in the following equation (5) is frequently employed in a method of evaluating contrast. The equation (5) is calculated with the maximum value (max) and the minimum value (mix) in the case of inputting an image having sinusoidally changing intensity distribution as shown in FIG. 3.

$$MTF = \frac{\max - \min}{\max + \min} \quad (5)$$

The contrast is maximized when the spatial frequency characteristic function MTF is equal to 1, and approaches zero as the contrast is reduced. In the simulation shown in FIG. 3, the MTF value of the 1-by-1 pattern has been 0.73. The MTF value can be readily calculated also when changing the aforementioned parameter condition. For example, MTF=0.96 when W=√2 p, and MTF=0.30 when W=2√2 p. This indicates that crosstalk from/to an adjacent dot is increased to reduce the contrast when the exposure beam diameter W is too large with respect to the minimum dot recording period p.

It has been determined from results of actual experiments made with the parameter of the ratio of the minimum dot recording period p to the exposure beam diameter W by an experimental apparatus described later and the results of the aforementioned simulation that an MTF value of at least 0.7 is practically necessary. W ≦ 2 p when expressed in the ratio of the minimum dot recording period p to the exposure beam diameter W.

While results similar to this have been reported as described above in relation to the ratio of the minimum recording period p to the exposure beam diameter W, numerical limitation related to the beam diameter is an important and inevitable premise condition so that conditions for ensuring a developing field for a high-frequency latent image described later effectively act in the present invention.

A frequency characteristic analysis theory of a latent image field on the developing part is now described.

Figures 4, 5:
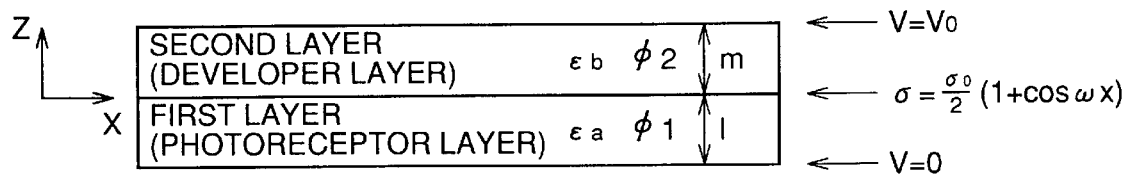
FIG. 4 illustrates a field analysis model of a developing part according to the embodiment of the present invention.
FIG. 5 illustrates standard values of variables for simulating latent image frequency characteristics of the image forming apparatus according to the embodiment of the present invention in the form of a table.

FIG. 4 shows a field analysis model of the developing part. The first layer is a photoreceptor layer having a thickness l, a dielectric constant $\epsilon_a$ and a potential function $\phi_1$. The second layer is a developer layer, i.e., a toner layer having a thickness m, a dielectric constant $\epsilon_b$ and a potential function $\phi_2$. The origin of coordinates along the z-axis is present on the boundary between the first and second layers. A conductive substrate having a potential 0 [V] is provided under the photoreceptor layer, while a developing electrode (developing roller) having a potential $V_0$ [V] is provided on the developer layer.

$$\sigma = \frac{\sigma_0}{2}(1 + \cos\omega x), \quad \omega = \frac{2\pi}{\lambda} \quad (6)$$

$$\frac{\partial^2 \phi_1}{\partial x^2} + \frac{\partial^2 \phi_1}{\partial z^2} = 0 \quad (7)$$
$$\frac{\partial^2 \phi_2}{\partial x^2} + \frac{\partial^2 \phi_2}{\partial z^2} = 0$$

$$\phi_1 = \phi_{1dc} + \phi_{1ac} \quad (8)$$
$$\phi_2 = \phi_{2dc} + \phi_{2ac}$$

$$\phi_{1dc}[x,z] = a_b + a_0 z \quad (9)$$
$$\phi_{2dc}[x,z] = b_b + b_0 z$$

$$\phi_{1ac}[x,z] = \{a_1 \cdot \epsilon^{\omega z} + a_2 \cdot \epsilon^{-\omega z}\}\cos(\omega x) \quad (10)$$
$$\phi_{2ac}[x,z] = \{b_1 \cdot \epsilon^{\omega z} + b_2 \cdot \epsilon^{-\omega z}\}\cos(\omega x)$$

$$\phi_{2ac} = -\frac{\frac{\sigma_0}{\epsilon_a}\frac{\sinh\{\omega(z-m)\}}{\cosh(\omega m)}\cos(\omega x)}{2\omega\left(\frac{\epsilon_b}{\epsilon_a} + \frac{\tanh(\omega m)}{\tanh(\omega l)}\right)} \quad (11)$$

$$\phi_{2dc} = \frac{2V_0\left(\frac{z}{\epsilon_b} + \frac{1}{\epsilon_a}\right) + \frac{1}{\epsilon_a}\frac{(m-z)}{\epsilon_b}\sigma_0}{2\left(\frac{m}{\epsilon_b} + \frac{1}{\epsilon_a}\right)} \quad (12)$$

Sinusoidal charge distribution a expressed in the above equation (6) is present on the surface of the photoreceptor layer (the boundary surface between the first and second layers). The electric fields of the photoreceptor layer and the toner layer can be described in the above Laplace equations (7).

AC and DC components of the potential functions are defined by the above equations (8). It is known that analytic solutions of such potential functions can be derived by obtaining the coefficients a1, a2, b1 and b2 of the general solutions expressed in the above equations (9) and (10).

When introducing continuity of the potential and continuity of dielectric flux density, the potential functions of the toner layer are derived as shown in the above equations (11) and (12).

The frequency characteristic of the latent image potential on the surface of the photoreceptor on the developing part is analyzed on the basis of the aforementioned analytic solutions. It is assumed that surface charge density $\sigma_0$ on the surface of the photoreceptor is constant regardless of the thickness l, as a restrictive condition in the case of employing the thickness l of the photoreceptor layer as a variable. When the photoreceptor 1 is charged, field strength $E_{ch}$ in the photoreceptor 1 is constant regardless of the thickness, as expressed in $E_{ch} = \sigma_0/\epsilon_a$.

Therefore, the field strength $E_{ch}$ is constant when the surface charge density so is constant, and tolerance of the photoreceptor 1 against dielectric breakdown strength can be set to a constant condition regardless of the thickness.

FIG. 5 shows standard values of respective variables for frequency characteristic simulation. The standard value of the surface charge density $\sigma_0$ of the photoreceptor 1 is set to a value obtained by calculation with a standard condition of charging a photoreceptor having a thickness l of 20 μm up to 1000 V as shown in FIG. 5, i.e., 1.33 [mC/m²].

FIG. 6 shows results of calculation of the relation between a latent image wavelength and a latent image potential amplitude with the parameter of the thickness l of the photoreceptor. The aforementioned FIG. shows the values of the variables other than the thickness l of the photoreceptor. Referring to FIG. 6, it is understood that the latent image potential amplitude is reduced as the latent image spatial frequency is increased. This corresponds to that the quantity of development of an image having a high latent image spatial frequency is reduced.

It is also understood that the latent image spatial frequency characteristic is flat when the thickness l of the photoreceptor is small, although the absolute amount of the latent image potential amplitude is small. This corresponds to that fluctuation of the quantity of development is small and the density is stable also when the latent image spatial frequency changes.

Similarly, FIG. 7 shows results of calculation of the relation between the latent image wavelength and the latent image potential amplitude with the parameter of the thickness m of the toner layer. In this case, the values shown in the aforementioned FIG. 5 are set to the variables other than the thickness m of the toner layer. Referring to FIG. 7, it is understood that the latent image potential amplitude is reduced as the latent image spatial frequency is increased, similarly to FIG. 6. It is also understood that the latent image spatial frequency characteristic is flat when the thickness m of the toner layer is small although the absolute value of the latent image potential amplitude is small similarly to FIG. 6.

A compatibility analysis theory on an isolated line and a periodic line is now described. In the above description, it has been assumed that charges σ present on the surface of the photoreceptor are sinusoidally distributed. However, this is insufficient for arguing compatibility of the isolated line and the periodic line, and hence the following function is introduced for calculating an electric field of an isolated line latent image. A periodic function $G(\theta)$ of a square having a period $2\pi$, a width $2\alpha$ and a height 1 is expressed in the following equation (14) with Fourier series:

$$G(\theta) = \frac{\alpha}{\pi} + \frac{2}{\pi}\sum_{n=1}^{\infty}\frac{\sin(n\cdot\alpha)}{n}\cos(n\cdot\theta) \quad (14)$$

The first and second terms on the right side of the equation (14) express DC and AC components respectively.

The maximum AC component $Am_{pac}$ of the latent image surface potential amplitude is expressed in the following equation (15) by substituting x=0, z=0 and ω=nω in $\phi_{2ac}$:

$$Amp_{ac} = \frac{\sigma_0}{2}\left[\left(\frac{\tanh(n\omega l)}{\varepsilon_a n\omega}\right)^{-1} + \left(\frac{\tanh(n\omega m)}{\varepsilon_b n\omega}\right)^{-1}\right]^{-1} \quad (15)$$

A latent image surface potential amplitude (DC component) $Amp_{ac\omega 0}$ at a low latent spatial frequency close to zero is expressed in the following equation (16) by substituting x=0 and z=0 in $\phi_{2ac}$ and obtaining the limit of ω→0:

$$Amp_{ac\omega 0} = \underset{\omega\to 0}{\text{Limit}}\phi_{2ac} = \frac{\sigma_0}{2}\left[\left(\frac{1}{\varepsilon_a}\right)^{-1} + \left(\frac{m}{\varepsilon_b}\right)^{-1}\right]^{-1} \quad (16)$$

Therefore, the frequency characteristic function $MTF_{lmt}$ of the latent image potential amplitude on the surface of the photoreceptor is expressed in the following equation (17):

$$MTF_{lmt} = \frac{Amp_{ac}}{Amp_{ac\omega 0}} \quad (17)$$

$$= \frac{\left(\frac{1}{\varepsilon_a}\right)^{-1} + \left(\frac{m}{\varepsilon_b}\right)^{-1}}{\left(\frac{\tanh(n\omega l)}{\varepsilon_a n\omega}\right)^{-1} + \left(\frac{\tanh(n\omega m)}{\varepsilon_b n\omega}\right)^{-1}}$$

$$\alpha = \frac{X_w}{X_w + X_b}\pi, \theta = \omega x \quad (18)$$

In order to apply an actual periodic line pattern having a white line width $X_w$ and a black line width $X_b$ to the above rectangular periodic function G, the relation of the above equation (18) may be substituted in the equation (14). Consequently, a response function RF expressed in the following equation (19) is obtained by multiplying the AC component of the rectangular periodic function G expressed in the equation (14) by the frequency characteristic function $MTF_{lmt}$ corresponding to the spatial frequency:

$$RF = \frac{X_w}{X_w + X_b} + \frac{2}{\pi}\sum_{n=1}^{\infty}MTF_{lmt}\frac{\sin\left(n\pi\frac{X_w}{X_w + X_b}\right)}{n}\cos(n\omega x) \quad (19)$$

The response function RF of the equation (19) is standardized since the rectangular periodic function G is standardized (amplitude=1). Therefore, an actual latent image potential profile PR is obtained by multiplying the response function RF by a full amplitude $2Amp_{ac\omega 0}$, as shown in the following equation (20):

$$PR = 2Amp_{ac\omega 0}\cdot RF \quad (20)$$

Results of analysis of compatibility of isolated lines and a periodic line are now considered. An isolated white line, an isolated black line and a periodic line are defined under conditions shown in FIG. 8, for calculating latent image potential characteristics through the above equation (20).

Figure 9:
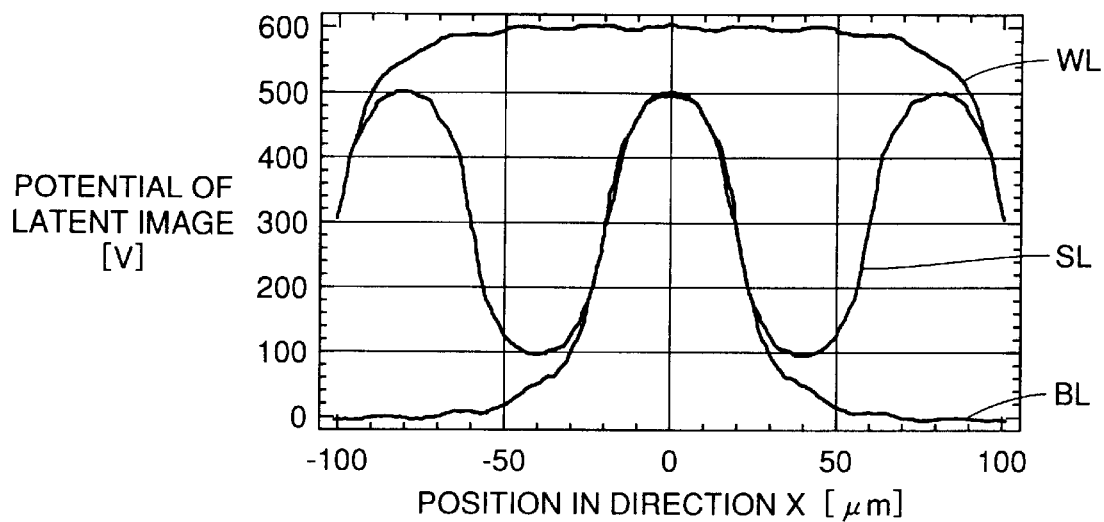
FIGS. 9 to 12 are graphs showing results of calculation of latent image potential characteristics according to the embodiment of the present invention.
Figure 10:
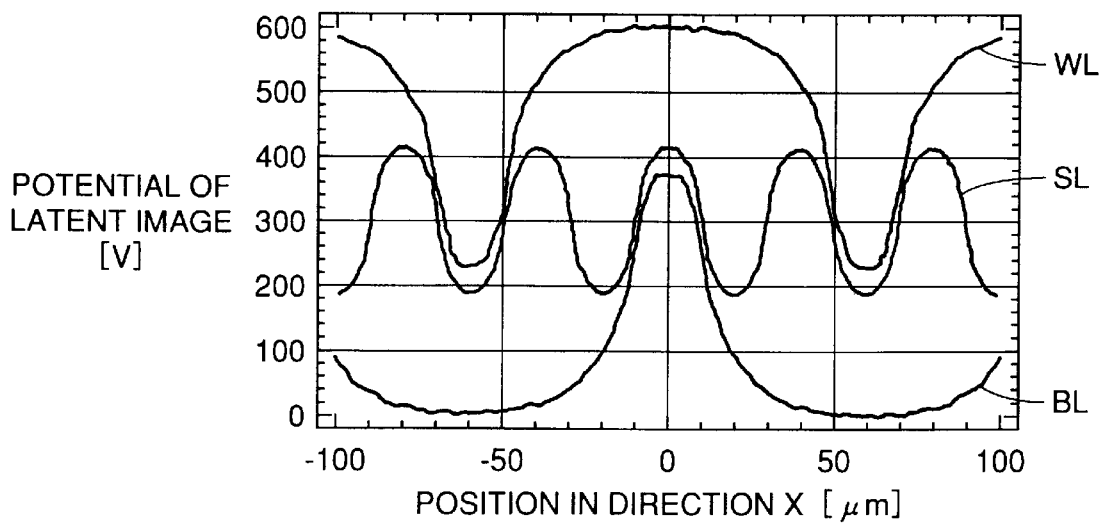
Figure 11:
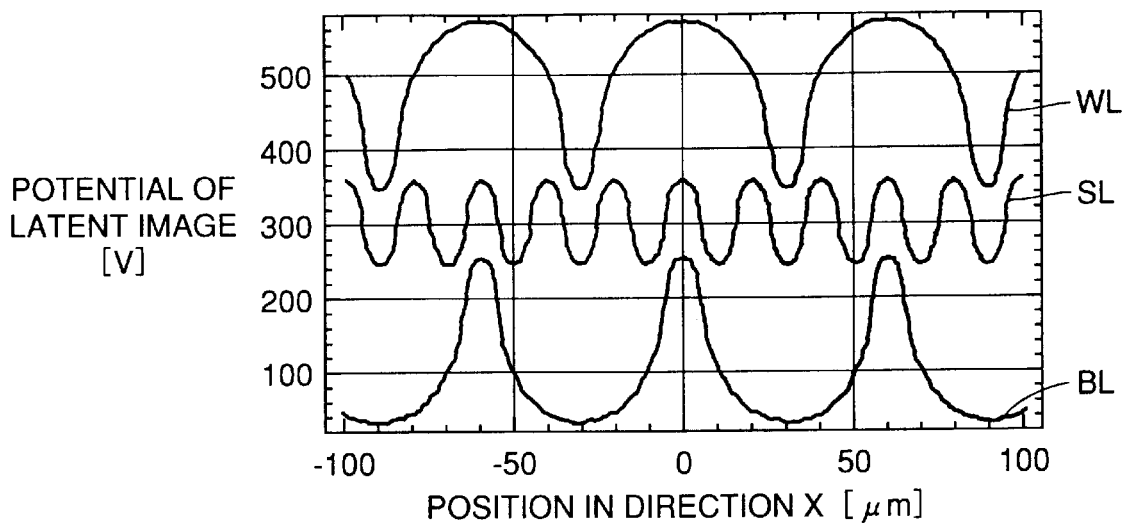
Figure 12:
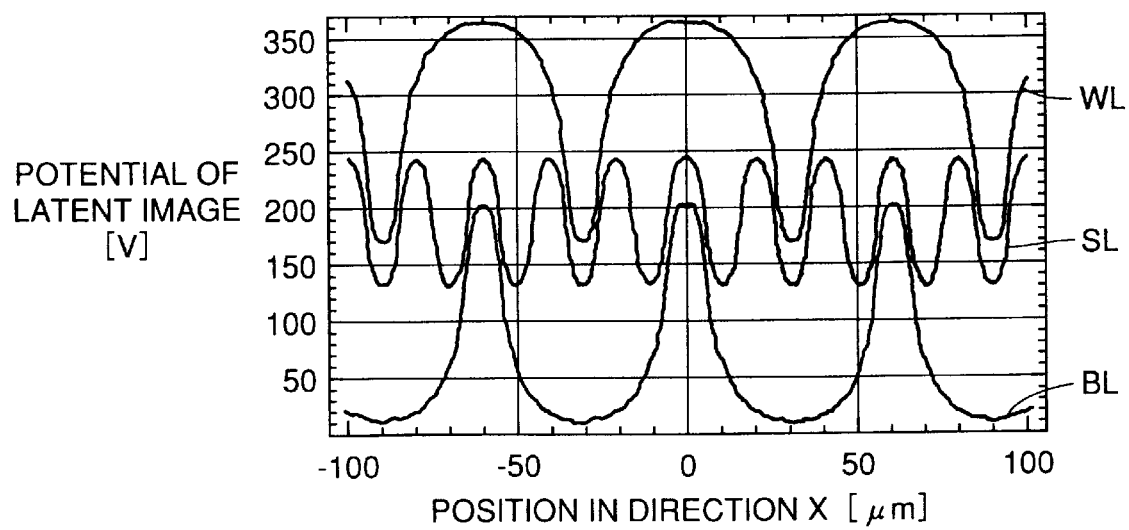

FIGS. 9 and 11 show results obtained by performing calculation on minimum dot recording periods p of 40, 20 and 10 μm under the standard conditions shown in FIG. 5 respectively. The minimum dot recording periods p of 40, 20 and 10 μm substantially correspond to resolution values of 600, 1200 and 2400 DPI respectively. FIG. 12 shows results of calculation obtained by reducing the thickness l of the photoreceptor from 20 μm to 10 μm with the minimum dot recording period p of 10 μm. FIGS. 9 to 12 show characteristic lines WL indicating the characteristics of the isolated white line, characteristic lines SL indicating the characteristics of the periodic line and characteristic lines BL indicating the characteristics of the isolated black line.

When associating such results of analysis related to the latent image potential with the density after development, it follows that a portion having a high latent image potential corresponds to black, a portion having density gradually lowered as the latent image potential is reduced corresponds to the so-called gray part, and a portion having the lowest latent image potential (the lowermost part of each characteristic line shown in FIGS. 9 to 12) corresponds to white. For example, FIG. 11 shows that black part density of the isolated black line shown by the characteristic line BL is smaller than white part density of the isolated white line shown by the characteristic line WL and that white part density of the isolated white line is larger than the density of a black part of the periodic line shown by the characteristic line SL. It can be said that the isolated white line, the periodic line and the isolated black line are not any longer compatible by a developing method of supplying a developing bias voltage of a single level regardless of the patterns of the isolated white line, the isolated black line and the periodic line in this state. Noting this compatibility, it is understood that the potential amplitudes of both the isolated line latent images and the periodic line latent image are reduced as the latent image spatial frequency is increased, to reduce compatibility in relation to the isolated white line, the isolated black line and the periodic line.

Figure 13:
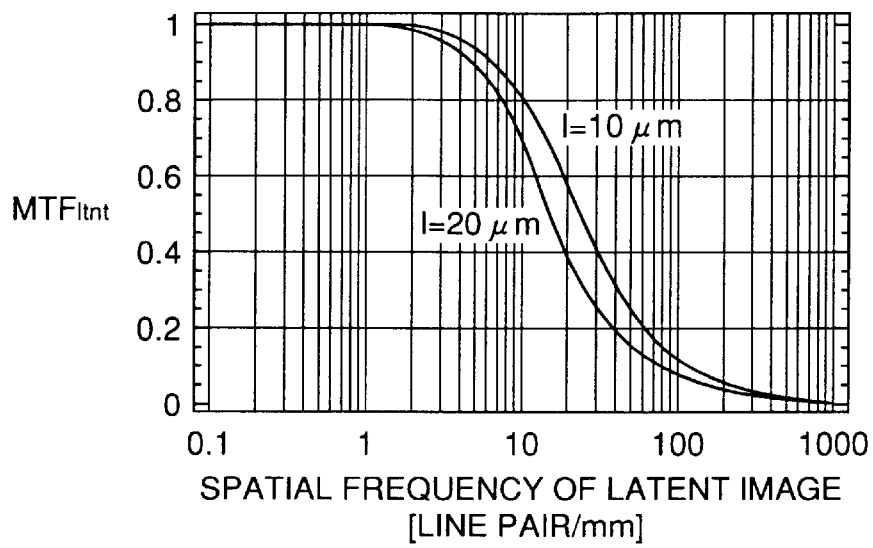
FIG. 13 is a graph showing results of calculation of a latent spatial frequency characteristic function according to the embodiment of the present invention.

Comparing FIGS. 11 and 12 with each other, it is also understood that the compatibility is improved by reducing the thickness of the photoreceptor. While it is clearly understood by expanding the above equation (15) that the aforementioned results of calculation of compatibility and the latent image spatial frequency characteristic function $MTF_{lmt}$ are closely correlated with each other, FIG. 13 shows results of calculation of the latent image spatial frequency characteristic function $MTF_{lmt}$ with reference to the thicknesses l of 20 $\mu$m and 10 $\mu$m, for further facilitating understanding. The values of the latent image spatial frequency characteristic function $MTF_{lmt}$ corresponding to FIGS. 9 to 12 are 0.58, 0.32, 0.16 and 0.25 respectively.

The aforementioned results are summarized as follows: In the latent image spatial frequency characteristic analysis, it has been indicated that the contrast of the potential is reduced due to influence by the thickness of the dielectric layer, i.e., the variable l and the variable m also when an ideal image is formed in relation to charge density, as shown in FIGS. 6 and 7.

In the compatibility analysis, it has been indicated that reduction of the aforementioned potential contrast not only reduces the absolute amount of the latent image potential amplitude but also remarkably damages the compatibility related to the isolated white line, the isolated black line and the periodic line.

When merely the absolute amount of the latent image potential amplitude is small, the charge potential on the surface of the photoreceptor may be increased or the field strength in the toner layer may be devised not to be reduced in order to cope with this problem to some extent. However, it has been indicated by introducing the latent image spatial frequency characteristic function $MTF_{lmt}$ that the problem of reduction of compatibility is decided by only the latent image wavelength, the thickness l of the photoreceptor, the thickness m of the toner layer and the dielectric constants thereof irrelevantly to the bias voltage, the charge voltage and the surface charge density. It is the feature of the present invention that a proper range of the latent image spatial frequency characteristic function $MTF_{lmt}$ defined in organic association with the thickness l of the photoreceptor, the thickness m of the toner layer and the dielectric constants thereof has been derived on the basis of this point.

Figure 14:
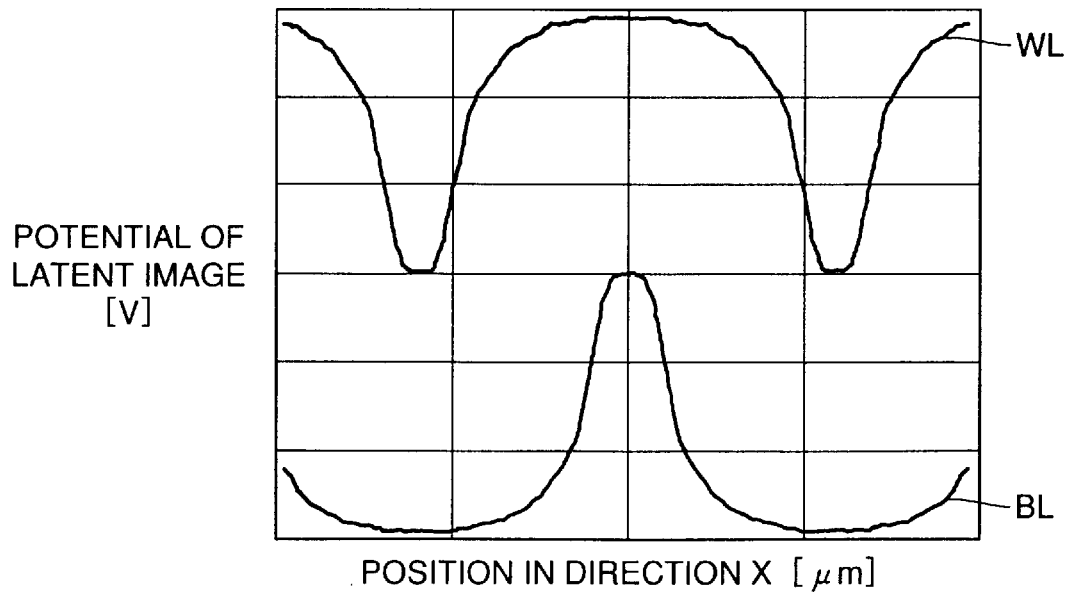
FIG. 14 is a graph showing potential characteristics of isolated white and black lines according to the embodiment of the present invention.

When providing such a compatibility criterion that the black part density of the isolated black line must not be smaller than the white part density of the isolated white line in the aforementioned results of compatibility analysis, a condition expressed as $MTF_{lmt} > 0.22$ is derived for the value of the latent image spatial frequency characteristic function $MTF_{lmt}$. This critical value substantially corresponds to a result calculated with the standard values shown in FIG. 5 and a value p=14 $\mu$m, for example. FIG. 14 shows potential characteristics of the isolated white line and the isolated black line in this case.

However, this value is a theoretically derived minimum necessary value and compatibility is not implemented in practice under this condition. The actual process has a part slightly different from the premise condition of theoretical analysis in a point that the charge density on the surface of the photoreceptor 1 is not ideally distributed or the quantity of development is decided by field strength on a position slightly separated from the surface of the photoreceptor. Therefore, a value larger than that derived by theoretical analysis is necessary for ensuring compatibility. A detailed experiment has been made with the following experimental apparatus for studying this point, to derive a condition $MTF_{lmt} \geq 0.3$:

The experimental apparatus and the experimental process are now described.

First, the experimental apparatus is described.

Figure 15:
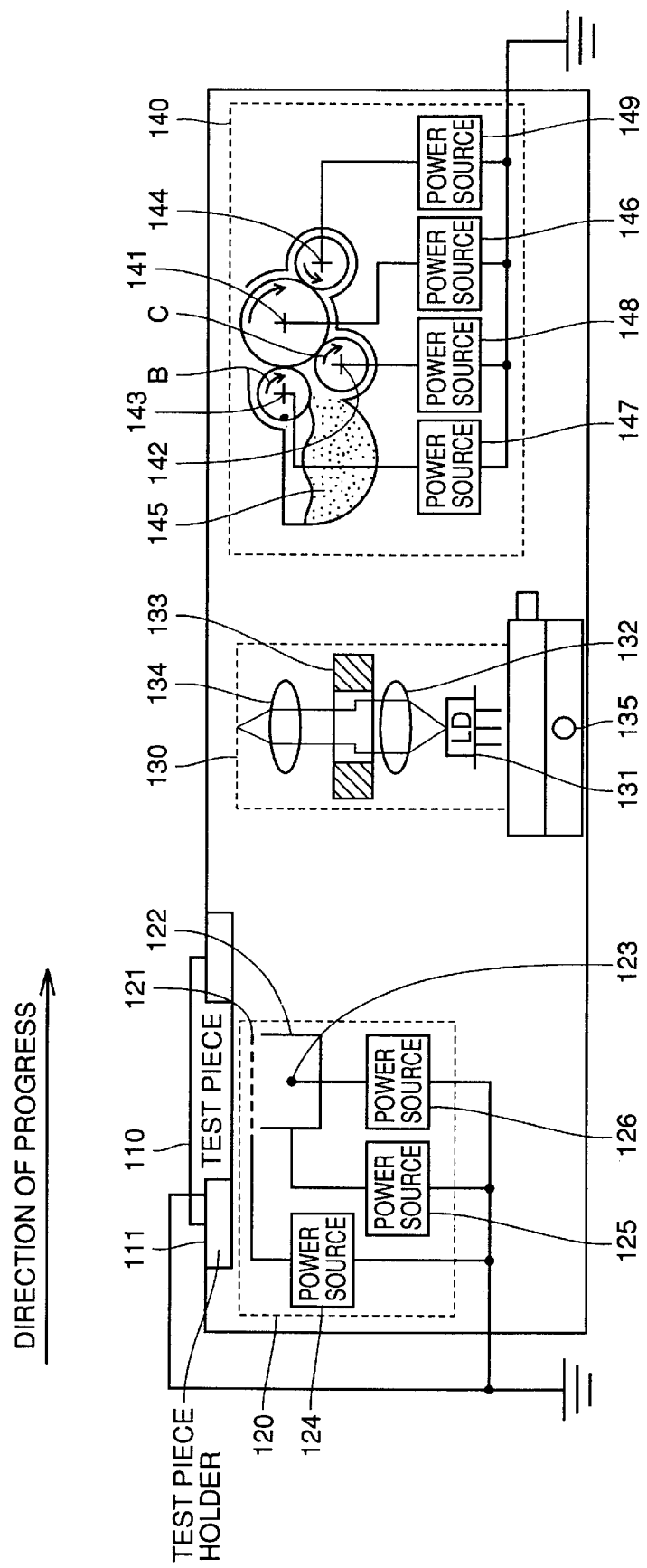
FIG. 15 is a side elevational view of an experimental apparatus according to the embodiment of the present invention.

FIG. 15 typically shows a side surface of the experimental apparatus for deriving the aforementioned compatibility criterial value. The experimental apparatus shown in FIG. 15 includes a charge part 120, an exposure part 130, a developing part 140 and a test piece 110 corresponding to a photoreceptor, extracted from a plurality of types of elements forming a printer or a copying machine employing an electrophotographic process. While such a printer or copying machine employing the electrophotographic process is generally provided with elements for transfer, fixation, cleaning the photoreceptor, discharging the photoreceptor, feeding paper and the like in addition to the above, the process is simplified in this study in order to note a line forming state on the photoreceptor.

The test piece 110 has a photoreceptor layer prepared by stacking an undercoat layer (UC layer), a charge generation layer (CG layer) and a charge transport layer (CT) on a semiconductor substrate in this order. The surface (opposite to the charge transport layer (CT layer)) of the photoreceptor layer is a photoreceptor surface. In this study, the thicknesses of these layers forming the photoreceptor layer are in the range of 8 to 20 $\mu$m. The test piece 110 is mounted on a test piece holder 111 while directing the surface formed with the photoreceptor surface downward. The test piece holder 111 is mechanically coupled to a linear slider (not shown) for linearly driving the test piece 110, and controlled by a controller (not shown) to move at a constant speed of 66 mm/s during the process.

The photoreceptor layer of the test piece 110 is prepared from a phthalocyanine organic photoreceptor charged in negative polarity. The conductive substrate of the test piece 110 is grounded through an electrode (not shown).

The charge part 120 is a scorotron, located on the side opposed to the photoreceptor surface of the test piece 110, formed by a grid 121, a case 122 and a wire 123. The grid 121, the case 122 and the wire 123 are connected to power sources 124, 125 and 126 respectively and so controlled that the photoreceptor surface potential of the test piece 110 is at a desired value. In this study, conditions are so set that the photoreceptor surface potential in development is −400 to −1000 V in consideration of attenuation, the so-called dark attenuation, in a dark place.

The exposure part 130 has a semiconductor LD (laser diode) 131 as an exposure beam source. A laser beam emitted from the LD 131 passes through a collimator lens 132 and is shaped into a parallel beam. The laser beam passing through the collimator lens 132 passes through an ND (neutral density) filter (not shown) so that its intensity is attenuated to a proper value, and is limited to a desired opening by an aperture 133 and incident upon an objective lens 132. The distance between the objective lens 134 and the test piece 110 is so adjusted that the objective lens 134 converges the laser beam and focuses the same on the photoreceptor surface of the test piece 110. The exposure part 130 is entirely fixed onto an X-Y stage 135 capable of driving the same along X- and Y-axes. A controller (not shown) locates the X-Y stage 135 on a desired position with precision of 1 μm. Further, the LD 131, driven by a laser driver (by Melles Griot: not shown), can arbitrarily control the laser power and the time for emitting the laser beam.

The details of the optical system employed for this study are as follows: The wavelength of the LD 131 is 780 nm, and the focal distance of the collimator lens 132 is 25.6 mm. Two types of objective lenses 134 having focal distances of 25.6 mm and 48 mm respectively are employed. The opening diameter of the aperture 133 is 0.8 to 8.0 mm. The optical system utilizes a diffraction limit since the aberration thereof can be substantially removed below the diffraction limit. NA (numerical aperture) can be adjusted by properly controlling the opening diameter of the aperture 133 and the aforementioned objective lens 134, for adjusting the beam diameter on the photoreceptor surface in the range of 300 DPI to 6000 DPI. The power of the laser beam applied onto the photoreceptor surface can be adjusted in the range of 0.5 nW to 3 mW by properly controlling the aforementioned ND filter and the aforementioned laser driver.

The developing part 140 includes a developing roller 141, a toner supply roller 142, a doctor roller 143, a recovery roller 144, toner 145 stored in a container and power sources 146 to 149. The developing part 140 is set to be opposed to the test piece 110. A layer of a prescribed quantity of adhesion of the toner 145 is formed on the developing roller 141. The toner supply roller 142 in contact with the developing roller 141 rotates along arrow C thereby supplying the toner 145 from the container to the developing roller 141. The toner 145 supplied to the developing roller 141 is transported to a contact portion between the doctor roller 143 and the developing roller 141 following rotation of the developing roller 141. The doctor roller 143 rotates along arrow B for forming a layer of a constant quantity of adhesion of the toner 145 on the developing roller 141. After the toner 145 supplied onto the developing roller 141 passes through a developing area for the test piece 110, the recovery roller 141 recovers an undeveloped part of the toner 145 remaining on the developing roller 141 and returns the same into the container. The developing roller 141 is rotated/driven by a motor (not shown) through a coupling, for driving the doctor roller 143, the toner supply roller 142 and the recovery roller 144 through gears (not shown) by the rotation thereof In this study, gear ratios etc. are so set that the peripheral speed of the developing roller 141 is 100 mm/s.

The power sources 146, 147, 148 and 149 are connected to shafts of the developing roller 141, the doctor roller 143, the toner supply roller 142 and the recovery roller 144 respectively for individually applying voltages. In this study, the power source 146 sets a bias voltage for the developing roller 141 in the range of −250 to −750 V while the power sources 147, 148 and 149 are so controlled that bias voltages for the doctor roller 143, the toner supply roller 142 and the recovery roller 144 are in the ranges of −300 to +300 V, 0 to −300 V and 0 to +300 V respectively.

In this study, the developing roller 141 is prepared by providing a rubber roller obtained by dispersing carbon particles in urethane rubber for providing conductivity around a shaft of stainless steel. As to this developing roller 141, the aforementioned resistance regulating base material is employed so that a resistance value $R_{dev}$ in the developing part 140 is $10^4$ to $10^6$ Ω, and a material having rubber hardness of 65° to 70° in Asker C based on SRIS (Society of Rubber Industry Standards) and surface roughness of 2 to 8 μm in 10-point mean roughness Rz based on JIS B0601 is employed. The doctor roller 143 has a metal surface having surface roughness of 0.1 μm in center line average height Ra defined in JIS B0601. The toner supply roller 142 is formed by covering the surface of a stainless rotary shaft with conductive urethane foam having volume resistivity (resistivity per unit volume) of $10^5$ Ω·cm and cell density of 80 to 105/inch. The toner supply roller 142 comes into contact with the developing roller 141 with a contact depth of 0.5 mm, and is rotated/driven along arrow C at a peripheral speed of 66 mm/sec. The recovery roller 144 has a metal surface so worked that Ra=0.1 μm, similarly to the doctor roller 143.

The toner 145 consists of carbon particles mixed into main resin of a styrene-acrylic copolymer for serving as a resistance regulator and a pigment, a CCA (charge control agent) serving as a charge controller and silica covering toner particles for improving flowability, and has a volume mean particle size (mean particle size per unit volume) of 3 to 10 μm in this study. In this study, the toner 145 is charged in negative polarity by −10 to −50 μC/g.

The experimental process is now described. The experimental apparatus itself is provided in a dark place with a black curtain (not shown) or the like. When driven by the linear slider to reach a charge area opposed to the charge part 120, the test piece 110 is charged to a prescribed surface potential by the charge part 120 under previously set conditions. When reaching the exposure area opposed to the exposure part 130, the charged test piece 110 stops so that the X-Y stage 135 is moved on the basis of previously set data and the LD 131 is turned on/off for irradiating the photoreceptor surface of the test piece 110 with the laser beam. Charges of the part irradiated with the laser beam are attenuated to form a latent image. Upon completion of exposure, the linear slider is driven again for transporting the test piece 110 to the developing area opposed to the developing part 140. The test piece 110 transported to the developing area comes into contact with the developing roller 141 while moving at a constant speed. The layer of the toner 145 in the prescribed charge quantity and the prescribed quantity of adhesion formed on the developing roller 141 comes into contact with the photoreceptor surface of the test piece 110 formed with the latent image, to be electrostatically developed in response to the latent image. The test piece 110 passing through the developing area stops after completely separating from the developing area. Thereafter the test piece 110 is detached from the test piece holder 111 for observing the developed image of the toner 145.

Figures 16, 17:
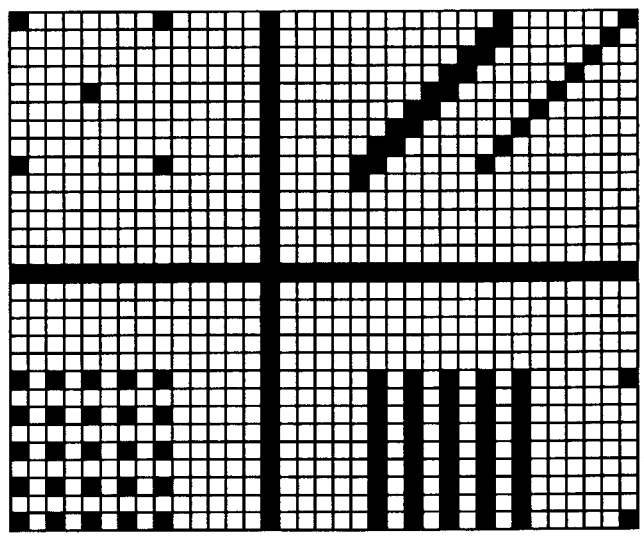
FIG. 16 is a model diagram showing an image pattern employed for evaluation according to the embodiment of the present invention.
FIG. 17 illustrates standard values of various parameters in experiments according to the embodiment of the present invention in the form of a table.

With this experimental apparatus, an image pattern shown in FIG. 16 was formed on the test piece 110 for observing and evaluating the developed image. FIG. 17 shows standard values of respective parameters for making the aforementioned series of experiments in the form of a table.

In order to verify the correlation between the thickness l of the photoreceptor and image quality, eight types of photoreceptors having thicknesses l shown in FIG. 18 were prepared. An experiment was made with the standard values of the parameters shown in FIG. 17 except the thicknesses l, for evaluating compatibility of isolated and periodic lines. This experiment was made on the basis of a compatibility criterion as to whether or not an isolated black line is formed under such a condition that a white-to-black duty ratio of a periodic line pattern is 50%. This is equivalent to the aforementioned compatibility criterion that the black part density of the isolated black line must not be smaller than the white part density of the isolated white line in the aforementioned results of compatibility analysis.

As a result of this compatibility evaluation, it has been confirmed that the isolated and periodic lines are compatible up to the photoreceptor thickness l of 20 µm. FIG. 18 shows the evaluation results as determination (1). When applying this condition to the spatial frequency characteristic function $MTF_{lmt}$ in the equation (15), the value reached 0.3.

The pattern shown in FIG. 16 also enables compatibility evaluation of isolated dots and periodic lines. When making evaluation with a criterion as to whether or not isolated black dots are formed under such a condition that the white-to-black duty ratio of a periodic line pattern is 50% similarly to the aforementioned isolated line compatibility evaluation, it has been confirmed that isolated dots and periodic lines are compatible up to the photoreceptor thickness l of 10 µm. FIG. 18 shows the evaluation results as determination (2). When applying this condition to the spatial frequency characteristic function $MTF_{lmt}$ in the equation (15), the value reached 0.48.

In order to verify the correlation between the exposure beam diameter W and the image quality, experiments were made on four types of exposure beam diameters W shown in FIG. 19 respectively. The experiments were made with the standard values of the parameters shown in FIG. 17 except the exposure beam diameters W, for evaluating compatibility of isolated and periodic lines etc. similarly to the above. FIG. 19 shows the evaluation results as determination (3). As understood from the compatibility evaluation results on the isolated and periodic lines in FIG. 19, the image quality was further improved at 20 µm smaller than the standard value of 30 µm, while the image quality was deteriorated at 40 µm larger than the standard value. However, it was possible to barely satisfy the aforementioned compatibility criterion. It was impossible to satisfy compatibility with the exposure beam diameter W of 50 µm. The relation between the exposure beam diameters W and the minimum dot recording periods p satisfying compatibility is expressed as W≦2p.

Then, five types of toner volume mean particle sizes Dt shown in FIG. 20 were prepared in order to verify the correlation between the toner volume mean particle size Dt and the image quality. An experiment was made with the standard values of the parameters shown in FIG. 17 except the toner volume mean particle sizes Dt, for evaluating compatibility of isolated and periodic lines etc. similarly to the above. FIG. 20 shows the evaluation results as determination (4). As understood from the compatibility evaluation results of isolated and periodic lines in FIG. 20, the image quality was further improved with the toner volume mean particle size Dt of 3.2 µm smaller than the standard value of 5 µm while the image quality was so deteriorated that it was impossible to satisfy compatibility when the toner volume mean particle size Dt was 7.5 µm larger than the standard value. The relation between the toner volume mean particle sizes $D_t$ and the minimum dot recording periods p satisfying compatibility is expressed as Dt≦p/4.

The resistance value of the developing roller 41 employed in the developing device according to the present invention is now described.

Figure 21:
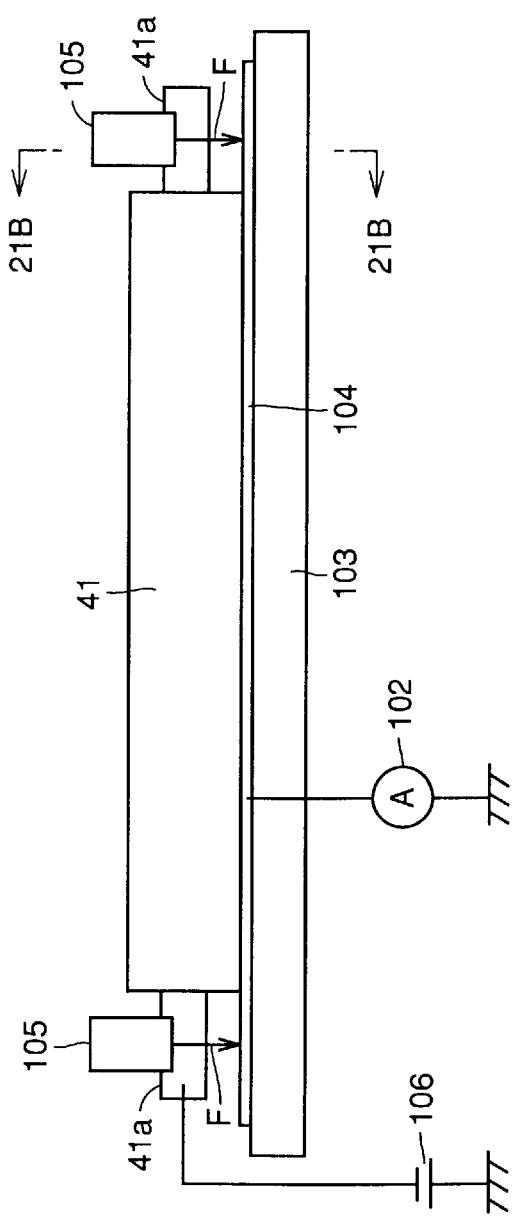
FIGS. 21A and 21B are block diagrams of a simple device for measuring the resistance value of a developing roller according to the embodiment of the present invention.

FIGS. 21A and 21B show a simple device for measuring the resistance value of the developing roller 41. FIG. 21B is a sectional view taken along the line 21B—21B in FIG. 21A. Referring to FIGS. 21A and 21B, the developing roller 41 is placed on a metal detection electrode 104 arranged on a flat plate 103 of an insulator, so that a power source 106 applies a bias voltage to the developing roller 41 while applying a prescribed load, i.e., pressure F from weights 105 along arrows. An ammeter 102 measures a current flowing in the detection electrode 104. When the resistance value of the developing roller 41 is uniform, a mean value of resistance values measured at some points along the circumferential direction of the developing roller 41 is regarded as the representative value. At this case, the pressure F is set equivalent to that applied when pressing the developing roller 41 against the surface of the photoreceptor 1 in practice. Thus, a contact area of a nip portion formed when pressing the developing roller 41 against the detection electrode 104 is equivalent to an area of the portion of the developing roller 41 coming into contact with the photoreceptor 1 in practice. In this state, the power source 106 applies the bias voltage to the conductive shaft 41a of the developing roller 41 for measuring voltage-to-current characteristics. The resistance value obtained by this measurement is substantially equivalent to the developing roller resistance $R_{dev}$ on the aforementioned developing part.

Figures 22, 23:
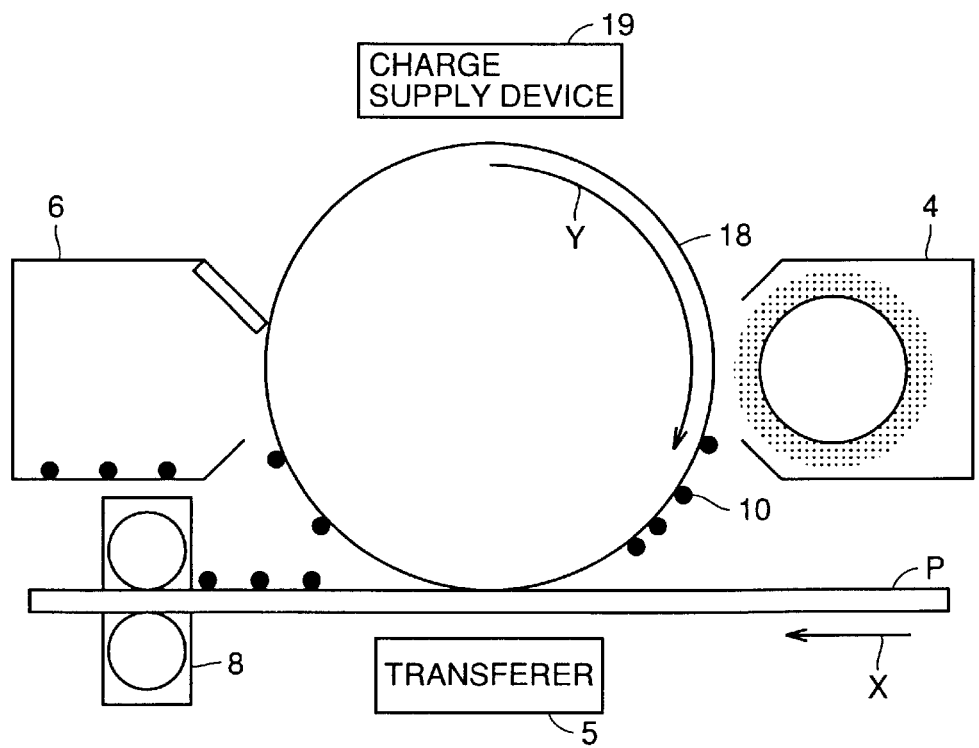
FIG. 22 illustrates the results of evaluation of compatibility of isolated and periodic lines with respect to different types of developing rollers according to the embodiment of the present invention in the form of a table.
FIG. 23 is a schematic block diagram showing an image forming apparatus employing a charge supply device according to the embodiment of the present invention.

FIG. 22 shows mean resistance values obtained by measuring resistance values of two types of electronic conduction developing rollers CLA and CLB prepared by dispersing carbon black in urethane resin and an ion conduction type developing roller CLC based on urethane resin as resistance layers of the developing roller 41 with the aforementioned device respectively. The resistance values were obtained by measuring current values upon application of a bias voltage of 10 V with R6871E by Advantest Corporation and converting the measured values.

Experiments were made with the standard values shown in FIG. 17 as to the parameters other than the developing roller resistance $R_{dev}$, for evaluating compatibility of isolated and periodic lines etc. similarly to the above. FIG. 22 shows the evaluation results as determination (5). As a result of compatibility evaluation of isolated and periodic lines, it was possible to satisfy compatibility by the developing rollers CLA and CLB while it was impossible to satisfy compatibility by the developing roller CLC, as shown in FIG. 22. The developing roller resistance $R_{dev}$ satisfying compatibility is not more than 1 MΩ. In addition to the aforementioned experiments, similar experiments were made with various minimum dot recording periods p (resolution), to derive conclusions similar to the above.

When setting various types of parameters to the aforementioned values of the frequency characteristic function of the electrostatic latent image for the image forming apparatus, it is possible to render the density of an image area (e.g., a color part of black or the like) compatible with the density of a non-image area (non-color part of white or the like) in each of a plurality of types of different image patterns in the image forming apparatus.

While the above description has been made with reference to expression of a black line etc., similar results can be obtained also in analysis with color toner, as a matter of course.

While an electrostatic latent image is generally formed by uniformly charging the surface of a photoreceptor with a charger and exposing the same with an optical beam as described above, a direct latent image forming method of directly supplying ions or charges onto an insulator from a charge supply device is also generally known as described in "Ion Printing Technology", Journal of Imaging Technology, Vol. 12, 144 (1986). In the former case where the electrostatic latent image carrier is a photoreceptor, the thickness l and the dielectric constant $\epsilon_a$ of the photoreceptor cannot be remarkably changed due to the restriction of the material, the problem of abrasion or dielectric breakdown of the film as described above. In the latter direct latent image forming method, an electrostatic latent image carrier may be formed not by a photoreceptor but by a general insulator, and hence the degree of freedom in material selection is increased. Thus, the dielectric constant $\epsilon_a$ of the electrostatic latent image carrier can be further increased for reducing the thickness 1 by improving abrasion resistance.

FIG. 23 schematically illustrates the structure of an image forming apparatus employing a charge supply device 19 enabling direct latent image formation. The image forming apparatus shown in FIG. 23 is different from that shown in FIG. 1 in a point that the image forming apparatus shown in FIG. 23 has a dielectric drum 18 as an electrostatic latent image carrier in place of the photoreceptor 1 shown in FIG. 1 and the charge supply device 19 in place of the charger 2, the optical system for the light 3 and the discharger 7 shown in FIG. 1. The dielectric drum 18 is prepared by forming a dielectric layer on the peripheral surface of a drum. In a process of image formation performed in the apparatus shown in FIG. 23, the charge supply device 19 including a plurality of charge sources is selectively driven for supplying ions or electrons onto the dielectric layer of the dielectric drum 18 serving as the electrostatic latent image carrier and forming an electrostatic latent image. The remaining process excluding formation of the electrostatic latent image is similar to the aforementioned one.

Figure 24:
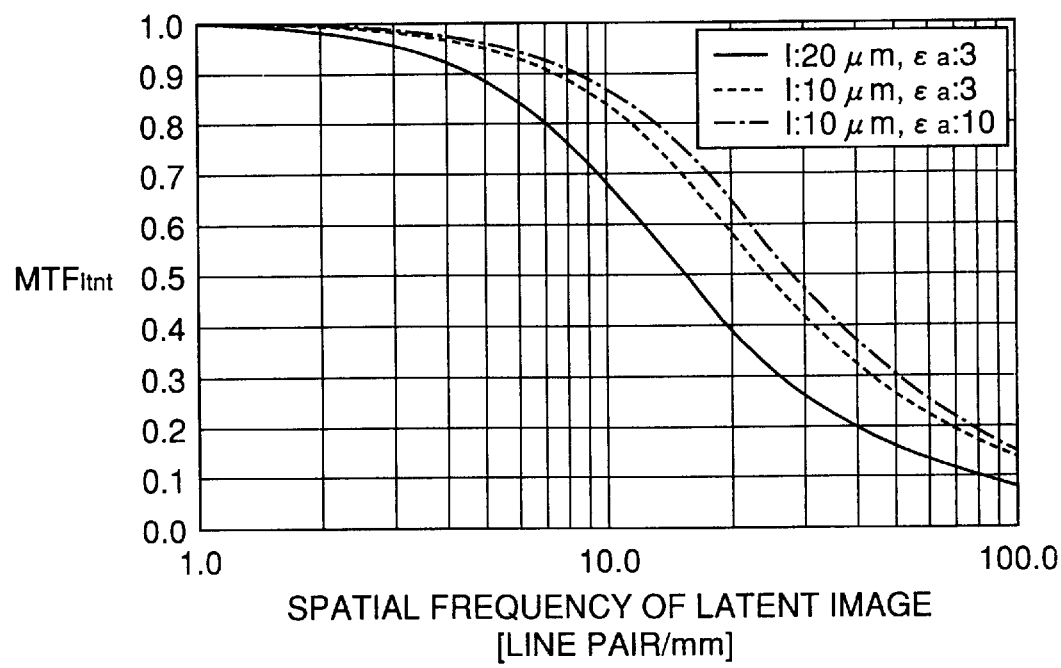
FIG. 24 is a graph for illustrating effects of improvement of latent image frequency characteristics upon employment of the charge supply device according to the embodiment of the present invention.

FIG. 24 shows results of a simulation for describing an effect of improving the latent image frequency characteristic function $MTF_{lmt}$ by employing the charge supply device 19 enabling direct latent image formation. Referring to FIG. 24, the spatial frequency of a periodic line latent image is about 12 (line pair/mm) as shown by a solid line and the value of the latent image frequency characteristic function $MTF_{lmt}$ is about 0.6 under conditions based on the standard values shown in FIG. 5 if the minimum dot recording density is 600 DPI, and an excellent output image can be expected when optimizing conditions of exposure, development, transfer and the like. When setting the minimum dot recording density to 1200 DPI under these conditions, the spatial frequency of the periodic line latent image reaches 24 (line pair/mm) and the value of the latent image frequency characteristic function $MTF_{lmt}$ is deteriorated to about 0.3.

When performing direct latent image formation with the charge supply device 19, the thickness 1 of the dielectric drum 18 serving as the electrostatic latent image carrier can be reduced from 20 $\mu$m to 10 $\mu$m and the dielectric constant $\epsilon_a$ can be increased from 3 to 10, as shown by a chain line or a one-dot chain line in FIG. 24. Thus, it is understood that the value of the latent image frequency characteristic function $MTF_{lmt}$ can be kept at about 0.6 also when the recording density is 1200 DPI, and image quality equivalent to that with the recording density of 600 DPI can be expected. In other words, the minimum dot recording period p may be not more than 43 $\mu$m.

According to this embodiment, the following characteristics can be attained: When setting the various parameters so that the value of the latent image frequency characteristic function $MTF_{lmt}$ is at least 0.3, crosstalk from/to an adjacent exposure beam is reduced, a high-definition latent image having small MTF deterioration can be formed, reduction of latent image potential contrast on the developing part can be prevented and the frequency characteristics of development can be improved. Thus, the aforementioned compatibility can be improved in relation to the density of an image area and that of a non-image area in each of different types of image patterns of a periodic line and an isolated line.

The electrostatic latent image carrier can be formed not by the photoreceptor 1 but by a general insulator when employing the charge supply device 19 enabling direct latent image formation on the electrostatic latent image carrier, whereby the degree of freedom in material selection as to the electrostatic latent image carrier is increased, the dielectric constant $\epsilon_a$ of the electrostatic latent image carrier can be further increased and the aforementioned latent image frequency characteristic function $MTF_{lmt}$ can be improved.

When setting the latent image frequency characteristic function $MTF_{lmt}$ greater than or equal to 0.48, compatibility of a periodic line and isolated dots is improved so that an image of higher definition can be output.

When setting the volume mean particle size Dt of the toner serving as a developer to not more than ¼ times the minimum dot recording period p, driving force for development can effectively act on the toner also in an electric field of a high-resolution electrostatic latent image having a minimum dot recording period p of not more than 43 $\mu$m, for obtaining excellent image quality.

When employing nonmagnetic monocomponent contact toner as the developer, the developing electrode can be set in the vicinity of the photoreceptor for attaining high resolution. In other words, the thickness m of the toner layer can be reduced so that the latent image frequency characteristic function $MTF_{lmt}$ can be increased, whereby the frequency characteristics of the developing field are consequently improved for obtaining a high-resolution image.

When setting the developing roller resistance $R_{dev}$ on the developing part of the developer carrier in the developing device to not more than $10^6$ [$\Omega$], the developer carrier can be substantially treated as a conductor. In other words, the surface of the developer carrier can be regarded as a developing electrode, whereby the toner layer thickness m can be reduced to attain an effect similar to the above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising an exposure part exposing a photoreceptor layer previously prepared with a minimum dot recording period and forming an electrostatic latent image and a developing part developing formed said electrostatic latent image with a developer layer, wherein the diameter of an exposure beam employed for exposure in said exposure part is less than or equal to twice the minimum dot recording period in peak intensity $1/e^2$, a spatial frequency characteristic function corresponding to said electrostatic latent image defined in association with at least the thickness of said photoreceptor layer, the dielectric constant of said photoreceptor layer, the thickness of said developer layer and the dielectric constant of said developer layer has a prescribed range, and said prescribed range is a range for compatibility of the density of an image area and the density of a non-image area in each of a plurality of types of different image patterns.

2. The image forming apparatus according to claim 1, wherein a spatial frequency characteristic function MTF (Modulation Transfer Function)$_{lmt}$ of said electrostatic latent image, expressed in the following equation, is greater than or equal to 0.3 assuming that p represents the minimum dot recording period, l l represents the thickness of said photoreceptor layer, $\epsilon_a$ represents the dielectric constant of said photoreceptor layer, m represents the thickness of said developer layer, $\epsilon_b$ represents the dielectric constant of said developer layer and ω represents a spatial frequency defined as ω=π/p:

$$MTF_{lmt} = \frac{\left(\frac{1}{\varepsilon_a}\right)^{-1} + \left(\frac{m}{\varepsilon_b}\right)^{-1}}{\left(\frac{\tanh(\omega l)}{\varepsilon_a \omega}\right)^{-1} + \left(\frac{\tanh(\omega m)}{\varepsilon_b \omega}\right)^{-1}}.$$

3. The image forming apparatus according to claim 2, wherein said spatial frequency characteristic function $MTF_{lmt}$ is greater than or equal to 0.48.

4. The image forming apparatus according to claim 2, wherein the mean particle size $D_t$ of said developer per unit volume is less than or equal to p/4.

5. The image forming apparatus according to claim 1, wherein a nonmagnetic monocomponent contact development method is employed for said development.

6. The image forming apparatus according to claim 5, wherein said developing part has a developer carrier for carrying said developer layer and sticking said developer to said electrostatic latent image, and the resistance of said developer carrier in a developing area is not more than $10^6 \Omega$.

7. An image forming apparatus comprising an electrostatic latent image forming part forming an electrostatic latent image of a minimum dot recording period on a previously prepared dielectric layer and a developing part developing formed said electrostatic latent image with a developer layer, wherein said minimum dot recording period is not more than 43 μm, a spatial frequency characteristic function corresponding to said electrostatic latent image defined in association with at least the thickness of said dielectric layer, the dielectric constant of said dielectric layer, the thickness of said developer layer and the dielectric constant of said developer layer has a prescribed range, and said prescribed range is a range for compatibility of the density of an image area and the density of a non-image area in each of a plurality of types of different image patterns.

8. The image forming apparatus according to claim 7, wherein a spatial frequency characteristic function MTF (Modulation Transfer Function)$_{lmt}$ of said electrostatic latent image, expressed in the following equation, is greater than or equal to 0.3 assuming that p represents the minimum dot recording period, l represents the thickness of said dielectric layer, $\epsilon_a$ represents the dielectric constant of said dielectric layer, m represents the thickness of said developer layer, $\epsilon_b$ represents the dielectric constant of said developer layer and ω represents a spatial frequency defined as ω=π/p:

$$MTF_{lmt} = \frac{\left(\frac{1}{\varepsilon_a}\right)^{-1} + \left(\frac{m}{\varepsilon_b}\right)^{-1}}{\left(\frac{\tanh(\omega l)}{\varepsilon_a \omega}\right)^{-1} + \left(\frac{\tanh(\omega m)}{\varepsilon_b \omega}\right)^{-1}}.$$

9. The image forming apparatus according to claim 8, wherein said electrostatic latent image forming part has a charge supply part, for driving said charge supply part to supply ions or electrons onto said dielectric layer and forming said electrostatic latent image on said dielectric layer.

10. The image forming apparatus according to claim 8, wherein said spatial frequency characteristic function $MTF_{lmt}$ is greater than or equal to 0.48.

11. The image forming apparatus according to claim 7, wherein a nonmagnetic monocomponent contact development method is employed for said development.

* * * * *

UNITED STATES PATENT AND TRADEMARK OFFICE
CERTIFICATE OF CORRECTION

| | |
|---|---|
| PATENT NO. | : 6,323,888 B1 |
| DATED | : November 27, 2001 |
| INVENTOR(S) | : Tadashi Iwamatsu, Tetsuro Toyoshima, Nobuyuki Azuma, Yoshinori Mutou and Yoshinori Nakajima |

It is certified that error appears in the above-identified patent and that said Letters Patent is hereby corrected as shown below:

<u>Title page,</u>
Foreign Application Priority Data, the second reference should read -- May 16, 2000 (JP) 2000-142663 --. (The number now reads "12-142663".)

Signed and Sealed this

Sixteenth Day of April, 2002

*Attest:*

JAMES E. ROGAN
*Attesting Officer*   *Director of the United States Patent and Trademark Office*